US008296161B2

(12) United States Patent
Polcari et al.

(10) Patent No.: US 8,296,161 B2
(45) Date of Patent: Oct. 23, 2012

(54) METHOD AND SYSTEM FOR WEALTH MANAGEMENT

(75) Inventors: Michael Peter Polcari, San Francisco, CA (US); Rowland W. Yerkes, San Ramon, CA (US); Ryan Choi, Foster City, CA (US); Ronald Vance Hess, Monte Sereno, CA (US)

(73) Assignee: salesforce.com, inc., San Francisco, CA (US)

( * ) Notice: Subject to any disclaimer, the term of this patent is extended or adjusted under 35 U.S.C. 154(b) by 988 days.

(21) Appl. No.: 12/231,779

(22) Filed: Sep. 5, 2008

(65) Prior Publication Data
US 2010/0070323 A1 Mar. 18, 2010

(51) Int. Cl.
*G06Q 10/00* (2006.01)
(52) U.S. Cl. .......................... 705/1.1; 705/7.11
(58) Field of Classification Search .................. 705/1.1, 705/7.11
See application file for complete search history.

(56) References Cited

U.S. PATENT DOCUMENTS

| | | | | |
|---|---|---|---|---|
| 7,996,270 B2* | 8/2011 | Sundaresan | .................. | 705/26.1 |
| 2007/0118394 A1* | 5/2007 | Cahoon | ........................... | 705/1 |
| 2008/0288277 A1* | 11/2008 | Fasciano | ......................... | 705/1 |
| 2010/0269158 A1* | 10/2010 | Ehler et al. | ...................... | 726/4 |

* cited by examiner

*Primary Examiner* — Mark A Fleischer
(74) *Attorney, Agent, or Firm* — David Lewis

(57) ABSTRACT

In accordance with embodiments, there are provided mechanisms and methods for wealth management. These mechanisms and methods for wealth management can enable embodiments to provide a multi-tenant database that stores information about clients of the tenants. In a multi-tenant database, a system for managing financial accounts is established, which may be useful for a tenant that is a financial analyst or that employs financial analysts. The multi-tenant database may include a calendar application that automatically includes the team members associated with the event being scheduled in a list of invitees, and the multi-tenant database may also includes relationship groups, such that information about related individuals (whom may have separate accounts) are automatically associated with one another. The ability of embodiments that provide relationship groups and teams can enable efficiently gathering information about related parties and efficiently inviting that interested parties to an event.

65 Claims, 24 Drawing Sheets

FIG. 17

METHOD AND SYSTEM FOR WEALTH MANAGEMENT

CROSS REFERENCE TO RELATED APPLICATIONS

The following commonly owned, co-pending United States Patents and Patent Applications, including the present application, are related to each other. Each of the other patents/applications are incorporated by reference herein in its entirety:

U.S. patent application Ser. No. 10/12/231,779 entitled METHOD AND SYSTEM FOR WEALTH MANAGEMENT, by Michael Polcari et al., filed Sep. 5, 2008; and U.S. Patent Application No. 60/902,990 entitled METHOD AND SYSTEM FOR WEALTH MANAGEMENT, by Michael Polcari et al., filed Feb. 22, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to wealth management in a database network system, and more particularly to wealth management in a multi-tenant database network system.

BACKGROUND

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid and efficient retrieval of accurate information and subsequent delivery of this information to the user system has been and continues to be a goal of administrators of database systems.

Unfortunately, conventional databases do not include convenient calendaring applications. Although calendar applications may exist in contexts other than databases, scheduling events and inviting all of the interested parties or gathering information about related individuals is cumbersome and may take many hours if, for example, there are many parties that need to be invited to the event or many related individual whose information need to be gathered. Additionally, preparing reports for household and/or groups of other related clients is cumbersome.

Accordingly, it is desirable to provide techniques enabling inviting interested parties, and/or gathering information from many related parties to improve ease of use of the information in the database system.

BRIEF SUMMARY

In accordance with embodiments, there are provided mechanisms and methods for wealth management. These mechanisms and methods for wealth management can enable embodiments to provide a multi-tenant database that stores information about clients of the tenants (in this specification, the terms clients of the tenant and customers are used interchangeably and may be substituted one for another to obtain different embodiments). In a multi-tenant database, a system for managing financial accounts is established, which may be useful for a tenant that is a financial analyst or that employs financial analysts, for example. The multi-tenant database may include a calendar application that automatically includes the team members associated with the event being scheduled in a list of invitees, and the multi-tenant database may also includes relationship groups, such that information about related individuals (whom may have separate accounts) are automatically associated with one another. The ability of the embodiments that provide relationship groups and teams to aggregate information from different clients can enable efficiently gathering information about related parties and efficiently inviting that interested parties to an event.

In an embodiment and by way of example, a method for wealth management is provided. The method embodiment includes automatically assembling invitations for a list of invitees that includes all team members, and automatically gathering information about a relationship group and/or gathering information about the members of the relationship group when gathering information about one of the members of the relationship group.

While the present invention is described with reference to an embodiment in which techniques for wealth management are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 17 shows a screenshot of an embodiment of the middle of the relationship webpage of FIG. 16.

DETAILED DESCRIPTION

General Overview

Systems and methods are provided for wealth management.

As used herein, the term multi-tenant database system refers to those systems in which various elements of hardware and software of the database system may be shared by one or more customers. For example, a given application server may simultaneously process requests for a greater number of customers, and a given database table may store rows for potentially an even greater number of customers. As used herein, the term query plan refers to a set of steps used to access information in a database system.

Next, mechanisms and methods for providing wealth management will be described with reference to example embodiments. The wealth management system stores information about financial accounts of clients of a multi-tenant system. The wealth management system may include a calendar (for scheduling events), tasks, and reminders of those events and tasks. The wealth management system may include a team view that allows the user to view information (e.g., contact information and/or other information) of each of the team members that assist in managing a particular client's accounts. For example, the team may include the user, a supervisor of the user, another financial advisor that covers for the user when the user is not available, and/or different advisors each specializing in a different type of asset. The calendar may include a feature such that when an event is scheduled, a list of invitees is automatically assembled, and by default if the user takes no actions preventing the invitations from being sent, each member of the list of invitees is automatically sent an invitation to the event. The list of invitees may include all of the team members.

Additionally, some clients of the tenant may be related to one another. For example, a group of members of an organization or of different members of a household may each be clients of the tenant. The wealth management system allows the user to establish relationship groups that relate different clients of the tenant. Once the relationship groups are established, information about the group as a whole and/or about other group members may be automatically retrieved in response to a request for information about one of the members. Additionally, the user may retrieve information about the group in a manner and/or a format similar to, or that is same as, when retrieving information about an individual.

Figure 1:
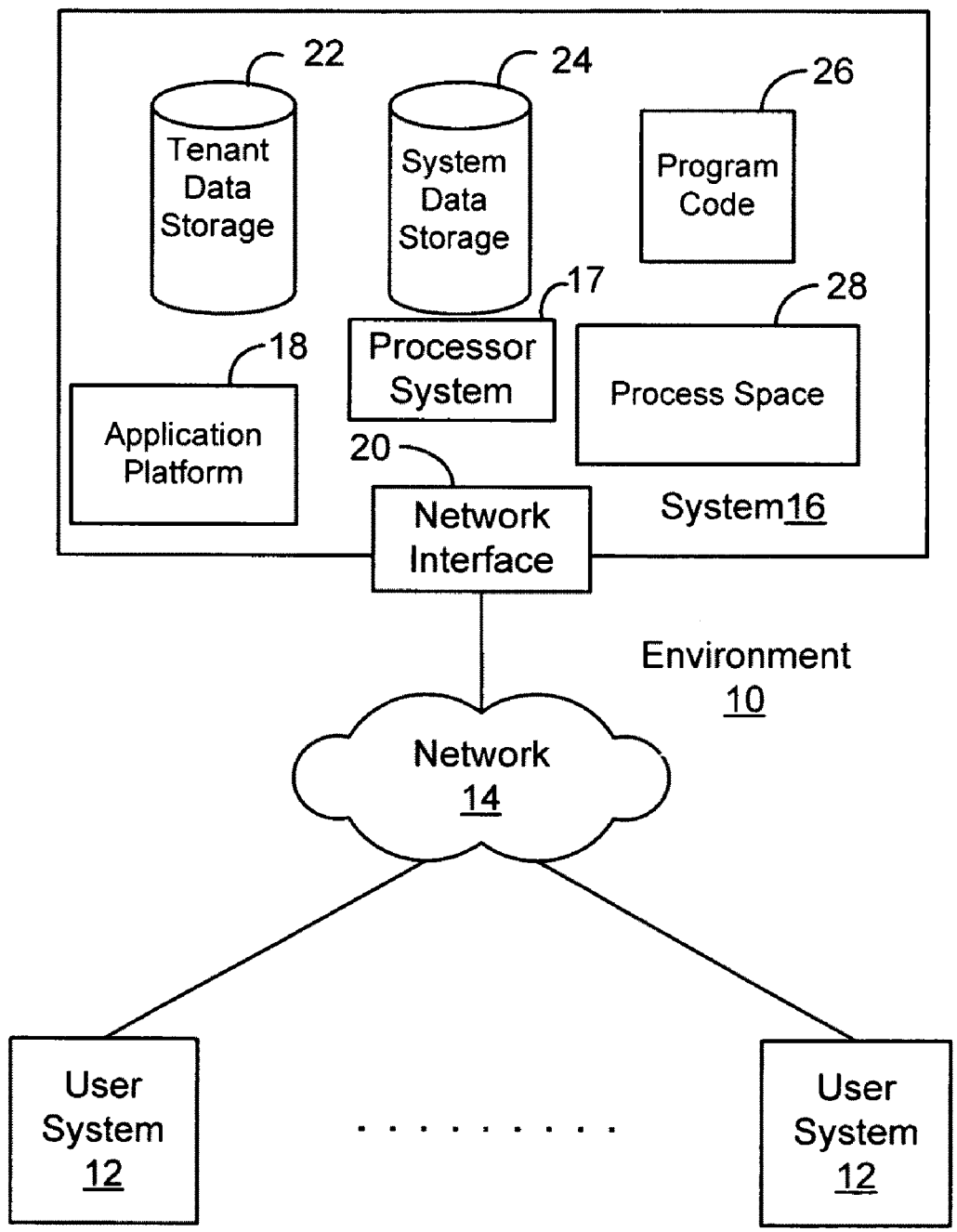
FIG. 1 illustrates a block diagram of an environment wherein an on-demand database service might be used.
Figure 2:
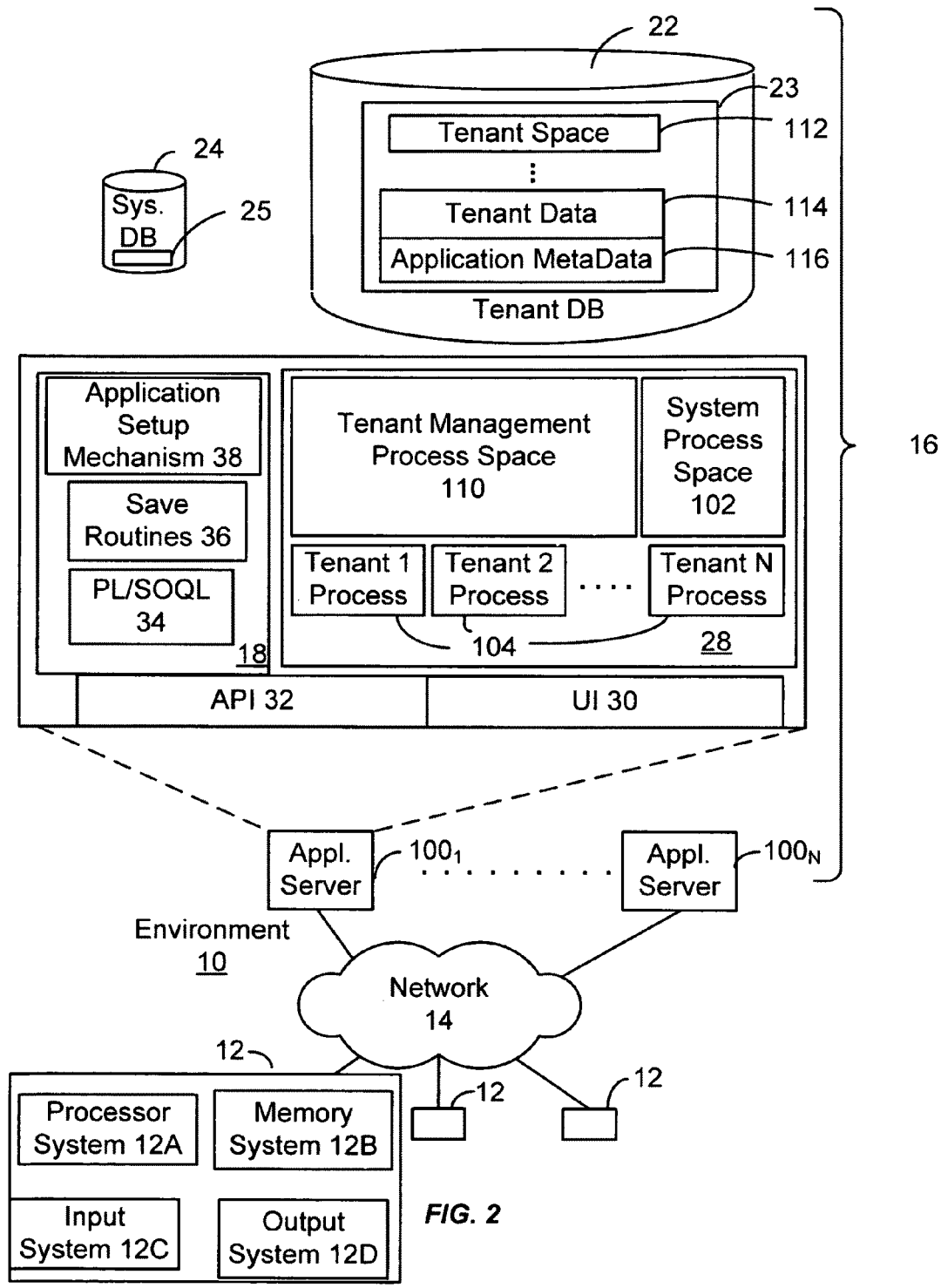
FIG. 2 illustrates another block diagram of the environment of FIG. 1.

System Overview, Description of FIGS. 1 and 2

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a pre-established database system that is made available to outside users that do not need to necessarily be concerned with building and/or maintaining the database system, but instead may be available for their use when the users need the database system (e.g., on the demand of the users). Accordingly, "on-demand database service 16" and "system 16" will be used interchangeably herein. Some on-demand database services may store information from one or more tenants stored into tables of a common database image to form a multi-tenant database system (MTS). A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared.

In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.)

using any communication medium and protocols (e.g., TCP/ IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by many or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Tenant Process

Figure 3:
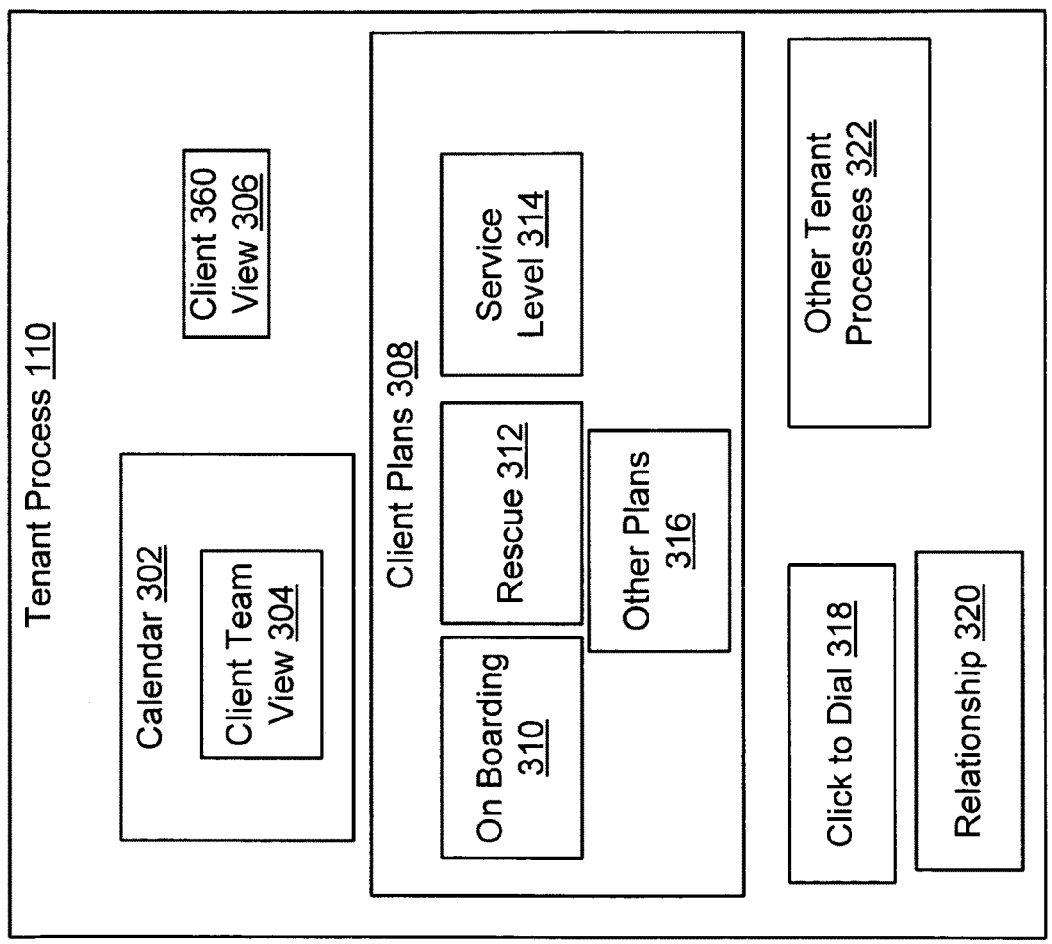
FIG. 3 shows a block diagram of an embodiment of the tenant process of FIG. 1.

FIG. 3 shows a block diagram of an embodiment of tenant process 110. Tenant process 110 may include calendar 302 having client team view 304. Tenant process 110 may also include client 360 view 306 and client plans 308, which may include on-boarding 310, rescue 312, service level 314, and other plans 316. Tenant process 110 may also include click to dial 318, relationship 320, and other tenant processes 322. In other embodiments, tenant process 110 may not have all of the elements listed and/or may have other elements instead of or in addition to those listed.

Calendar 302 is an application that presents a calendar to the user. Calendar 302 may include indications as to when events that have been scheduled occur and/or when scheduled tasks are due, for example. Calendar 302 may include a feature that allows an event to be dragged and dropped to another date. For example, if an event is initially scheduled for May 4, 2009, and then the user decides to reschedule the event, the user may use a pointing device, such as a mouse, touch pad, or track ball to select the event, drag the event to another day, such as May 5, 2009, and drop the event on that date (e.g., by clicking twice with the pointing device), thereby completing scheduling the event for May 5, 2009.

Client team view 304 is provided to assist with scheduling meetings including clients and/or team meetings. In an embodiment, unlike other calendaring applications, the availability of both the clients and the team members are captured, which are presented to the user for scheduling a meeting. Prior to the current invention capturing the schedules of the all of the clients and the team members took more than an hour and often days, because each new employee or vendor would need to be manually added to each group that they were supposed to be a part of. Consequently, scheduling meetings that included both team members and clients took even longer capturing the schedules of the team members and clients. With client team view 302, each new employee and vendor is automatically added to multiple groups depending upon their position in relationship to the company (in this specification the terms company and tenant are used interchangeably and different embodiments may be obtained by substituting one for the other). With client team view 302, adding a new team member and/or setting up a team is reduced in time (e.g., to 15 minutes). Also, security rules are automatically enforced according to where the new member is in the hierarchy, and this hierarchal placement is automatically respected. Client team view 302 may also allow and/or otherwise facilitate sharing of information between companies that are both tenants of the system. In response to adding a team member to a team, tenant process 110 may include machine instructions that cause a notification to be sent to each user that is a member of the team and/or to the new team member automatically. Additionally or alternatively, client team view 302 may include instructions for assigning tasks across the team.

Client 360 view 306 is a compact and/or summary view of a client's information, which may be useful for financial advisors and others. Client 360 view 306 may provide client profiling and/or a complete view of all customer centric information. The client 360 view 306 may include an interaction management feature that includes last touch dates, next touch dates, and hovering sub-displays to provide information about an item when the cursor is nearby. Client 360 view 306 may provide Coverage Team Management, and allow the user to view cases. Client 360 view 306 may be easily integrated with financial accounts, easily integrated with Appexchange partners, and may provide solutions for portfolio management, keeping track of privacy requests (e.g., "Do Not Call/Privacy"), and compliance with other types of rules (such as company rules, federal and state laws, federal and state regulations, and/or industry rules).

Client 360 view 306 may give the user only the most critical information about a client. By clicking on one or more locations of the webpage of client 360 view 306, a detailed view of the client's information may be provided. The layout of both the full view and compact view are customizable by the organization. Since client 360 view 306 is customizable, different organizations can display a different subset of fields depending on what's important to that tenant and/or client.

Client plans 308 may be action plans that are provided to the user that allow firms and users to 'template' a set of tasks. Client plans 308 may enable the standardization of processes. Client plans 308 may provide the flexibility to tailor the action plan for each client. Client plans 308 may also facilitate the sharing of best practices.

On-boarding 310, rescue 312, service level 314, and other plans 316 are examples of action plans that may be included within client plans 308, which may be tailored to the client using the software associated with the action plan page of client plans 308. On-boarding 310 may be an action plan for adding a client to the tenant. Rescue 312 may be an action plan for a client of a tenant that is in financial trouble or other trouble. Service level 314 may have standardized touch points (a touch point is a point link on a display image or a point on a display image that causes another item to be displayed as a result of hovering over the point with the cursor). Tenant process 110 may also include click to dial 318, relationship 320, and other tenant processes 322.

Service level 314 may be a view that is provided for viewing details of a client. Service level 314 may include compliance features, which may include checks that Federal, State, and/or company rules are being complied with. For example, the compliance feature may check that the amount of money invested in IRAs or 401K accounts does not exceed the maximum allowed by law. Service level 314 may capture personal, regulatory, and investment details, track approvals, and the last date that the client information was updated. For example, service level 314 may include a feature in the workflow that alerts the user when the workflow is out of date. A firm may use the data in service level 314 to check for transaction suitability compliance. Other plans 316 may include any of a variety of other action plans, which may be created by the tenant, a user of the tenant, and/or may be provided to the tenant by the host.

Click to dial 318 may provide Computer Telephony Integration (CTI) in the form of a click-to-dial link for dialing a phone number. The CTI may be an application integrating computer and telephone functions, allowing the computer to control a telephone and/or respond to a telephone. The CTI may be an application that runs on system 16 and interacts with the telephone via a WAN and/or may download a cookie or application to user system 12. Click to dial 318 may provide a feature for capturing the call and for capturing notes associated with the call. For example, upon hanging up, the time, the phone number and/or the client to whom the call was made may be automatically recorded. Click to dial 318 may aid in compliance and in streamlining work processes (e.g., such as by keeping notes on and/or about phone calls).

Relationship 320 may allow the user to place two or more clients into a relationship group. For example, a wife and husband may be placed in the same relationship group, which represents the household of the wife and husband. Once in the relationship group, via relationship 320, the user may be able to see information of the entire group, which may include information displaying and/or summarizing the aggregate information of the group. For example, with relationship 320, the user may be able to see the network of the entire group and/or the total spending, investments, and/or earnings for a period of time, such as a fiscal year, for the entire group. Additionally, when selecting to view a group, as a result of machine instructions associated with relationship 320, the user may be able to view the information associated with each member of the group. Similarly, as a result of machine instructions associated with relationship 320, upon selecting to view the information of one member of the group, the information associated with another member of the group and/or information about the group as a whole may also be displayed. Other tenant processes 322 may include any of a number of other tenant processes. Relationship 320 may include an option as to whether to include a client of the tenant (that is a member of the relationship group) in a role up, such that the financial information about that client will be included in the aggregate financial information of the relationship group. Relationship 320 may also include priorities that are assigned to one or more members of the relationship group. In an embodiment, each of the tenant's clients may be in many relationships with different companies and/or may have multiple relationships with a single company. Relationship 320 may be associated with different levels of access. A user may need a certain level of access to see a given relationship group and/or a user that has an appropriate level of access to see a given relationship group may not have a high enough level of access to see certain members of the relationship group. Thus, in an embodiment, even after finding the individual, the user may not have appropriate permissions to see the relationship group that the individual belongs to. The ability to view the group does not necessarily imply the ability to view all members, and similarly the ability to view a single member does not necessarily imply the ability to view the group. Optionally, a tenant may given the option to configure the tenant's access such that having permission to view an individual allows the user to view the group that the individual is a member of and/or such that having access to a relationship group allows the user to view all members of the relationship group, if that is preferable.

Overview of Website Provided to Tenant

Figure 4:
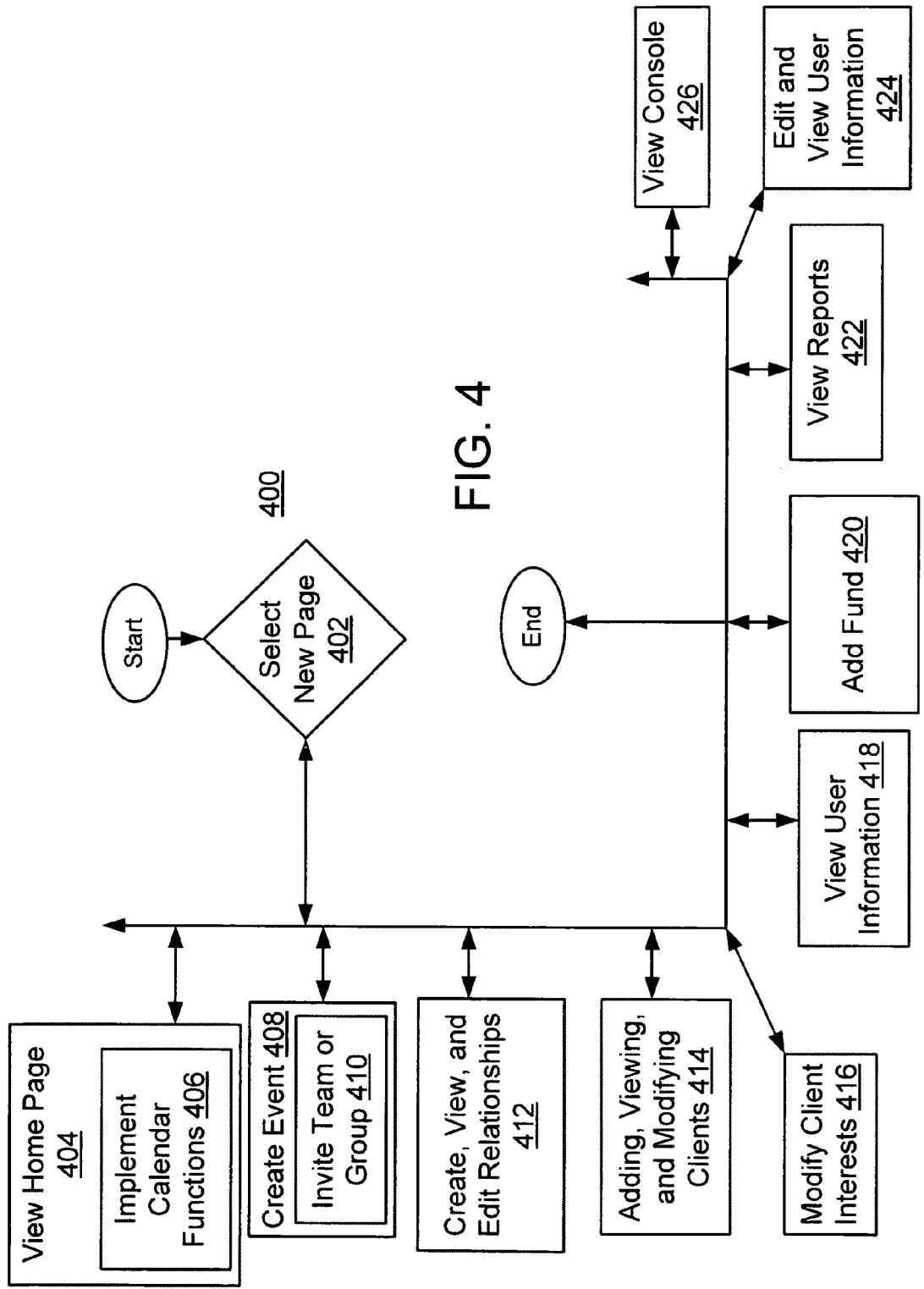
FIG. 4 shows a block diagram of an embodiment of a method implemented by a website provided to the tenant.

FIG. 4 shows a block diagram of an embodiment of a method implemented by a website provided to the tenant. In step 402, the user decides which webpage to select. The initial webpage may include links for viewing any of a number of webpages and/or for initiating any of a number of tasks. The double headed arrow attached to the decision box of step 402 indicates that after displaying the webpage performing and/or task selected, the user may return to select another webpage and/or task. From step 402, the user may select to implement any of steps 404-426. While implementing any of steps 404-426, the user may make another selection (which is equivalent to returning to step 402) and implement any of the other steps 404-426, as indicated by the double headed arrows.

In step 404, if in step 402 the user decides to select the home page, in step 404, the user views the home page. In an embodiment, while in step 404, the user may be able to view a calendar that shows upcoming events, deadlines, and/or tasks. In step 406, the user may view a calendar and/or implement other calendar functions.

Create event 408, may create an event that is added to the schedule. Invite team or group 410, when selected, may invite all of the members of a team and/or all of the members of a relationship group. Alternatively, or additionally, invite team or group may facilitate selecting which team members and/or relationship group members to invite, and send an invitation to the selected members.

Create, view, and edit relationships 412 may create, view, and/or edit relationship groups. Adding, viewing, and/or modifying clients 414 may allow the user to add a new client (or customer) of the tenant, view information related and/or about an existing client (of the tenant), and/or modify the content of the client information. The client information may include the net worth of all of the client's holdings, the value of each of the client's investments, contact information for the client, investment priorities, and/or risk level that the client is willing to tolerate, for example. The client information may also include client interests, which may include information about the client that may assist in adding a personal touch to the client-user relationship. For example, client interests may include hobbies, preferred leisure time activities, political interests, types of movies the client is interested in. Modify client interests 416 may allow the user to change entries to the client interest information.

View user information 418 may allow an administrator and/or a client to edit and/or view information about a user, such as the commissions earned by the user, the number and names of different stocks, bonds, mutual funds, other financial instruments that the user sold. Add fund 420 may allow an administrator to add a fund to the list of funds that the user may sell. View reports 422 may allow the user and/or an administrator to produce reports related to the performance and/or current state of a particular client, relationship group, and/or team. View reports 422 also may allow the view and/or creating of other reports, also. Edit and view user information 424 may allow a user and/or administrator to edit and/or view information about a user, such as the contact information of the user, client's of the user, activities of the user and/or other information about the user. View console 426 may allow a user to view a condensed version of the information related to the user's clients. View console 426 may also present the user with links for viewing the detailed information about a client. Corresponding to each of the above steps, on the client side (at user system 12), the client (user system 12) sends a request to system 16 to perform the task and/or view a webpage. If a request to perform a tasks was sent, then in response receives an updated webpage, which may contain a confirmation that the task requested was performed, results of the task requested. If a request to view a webpage was sent, then in response user system 12 receives the new webpage. On the server side system 16 receives the request sent by user system 12, processes the request, and then sends a response to user system 12. If the request was to view a new webpage, the processing of the request may include retrieving data to display on the webpage, sending the response may include sending the webpage to user system 12. If the request was to perform a task, processing the request may include performing the task, and sending the response may include sending an updated webpage and/or a new webpage confirming that the task was performed and/or displaying the results of the task.

In an embodiment, each of the steps of method 400 is a distinct step. In another embodiment, although depicted as distinct steps in FIG. 4, steps 402-426 may not be distinct steps. In other embodiments, method 400 may not have all of the above steps and/or may have other steps in addition to, or instead of, those listed above. The steps of method 400 may be performed in another order. Subsets of the steps listed above as part of method 400 may be used to form their own method.

Server Side Method for Retrieving Customer Information

Method 500 is a method for retrieving information about a customer that is implemented by a server. In step 502, system 16 receives a request for information about a customer. In step 504, system 16 retrieve customer information from the tenant database 22. In step 506, a determination is made as to which (if any) relationship group the customer belongs. In step 508, information about the relationship group is retrieved. Step 508 may include one or more sub-steps, which may include steps 510-514. In step 510, parameters characterizing a relationship group are retrieved, such as the name of the relationship group, a description of the relationship group, the total value of the holdings, investments, gains, and/or losses of the relationship group may be retrieved. In step 512, other members of the relationship group are determined. In step 514, information about the other members of the relationship group is retrieved. In step 516, information retrieved is sent to the user for display.

Figure 5:
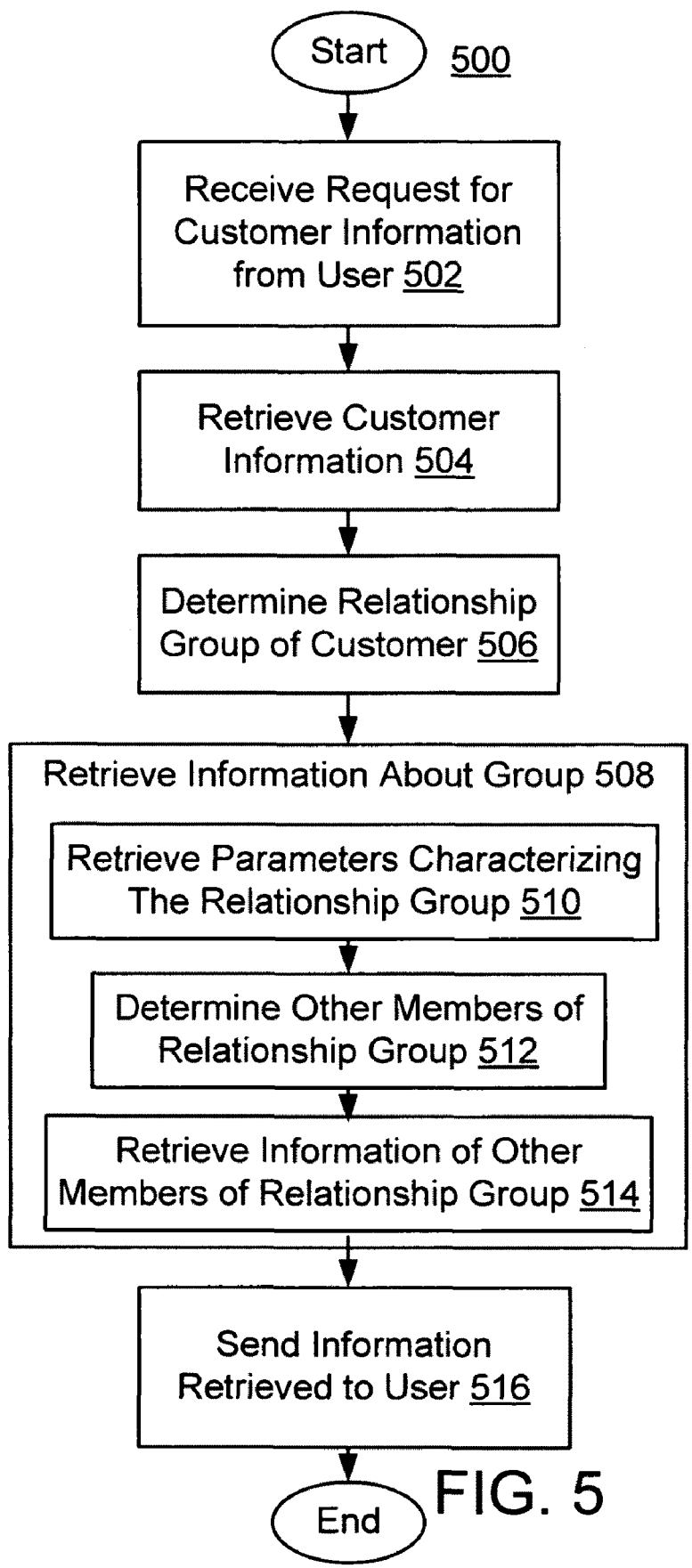
FIG. 5 shows a flowchart of an embodiment of a method for retrieving information about a customer that is implemented by a server.

In an embodiment, each of the steps of method 500 is a distinct step. In another embodiment, although depicted as distinct steps in FIG. 5, steps 502-516 may not be distinct steps. In other embodiments, method 500 may not have all of the above steps and/or may have other steps in addition to, or instead of, those listed above. The steps of method 500 may be performed in another order. Subsets of the steps listed above as part of method 500 may be used to form their own method.

User Side Method for Retrieving Customer Information

Method 600 is a method for retrieving information about a customer that is implemented by the user. In step 602, the user sends a request for customer information to system 16. Step 602 may cause steps 502-514 to be implemented by system 16, during which the server retrieves the information requested. In step 604, in reply to step 602, the user receives the customer information requested from system 16. In step 606, also in reply to the request of step 602 and also as a result of one or more of steps 502-514, if the user is a member of a relationship group, information about the relationship group is received. Step 608 may be a sub-step of step 606. In optional step 608, information about one or more members of the relationship group (e.g., information about each member of the relationship group) is received. Steps 604-608 may include rendering the information and/or presenting the information on a monitor for the user (e.g., or user system 12).

Figure 6:
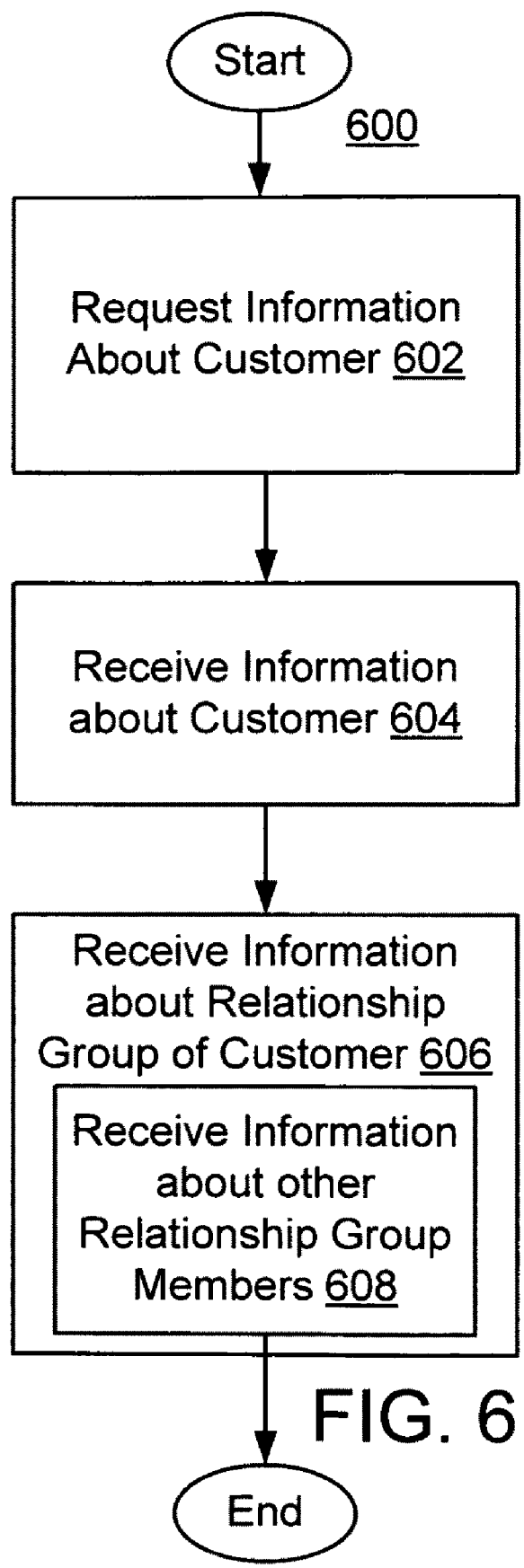
FIG. 6 shows a flowchart of an embodiment of a method for retrieving information about a customer that is implemented by the user.

In an embodiment, each of the steps of method 600 is a distinct step. In another embodiment, although depicted as distinct steps in FIG. 6, steps 602-608 may not be distinct steps. In other embodiments, method 600 may not have all of the above steps and/or may have other steps in addition to, or instead of, those listed above. The steps of method 600 may be performed in another order. Subsets of the steps listed above as part of method 600 may be used to form their own method.

Server-Side Method of Scheduling an Event

Figure 7:
FIG. 7 shows a flowchart of an embodiment of a method of scheduling an event at the server.

FIG. 7 shows a flowchart of an embodiment of a method 700 of scheduling an event at the server. In step 702, system 16 may receive a request to add an event to the user's calendar. In step 704, system 16 sends a list of team members to the user, which is automatically selected by default as invitees. Optionally, system 16 may also send a list of members of relationship group to the user as part of the default list of invitees. In step 706, system 16 receives requests to change the list of invitees. For example, system 16 may receive one or more requests to remove invitees from the list and/or to add invitees to the list. In step 708, system 16 receives a request to send invitations to the event. In step 710, system 16 sends invitations for the event to the members of the team that were on the list of invitees (which in an embodiment is all of the team members except for those expressly removed by the user). In step 712, system 16 sends invitations to the event to all team members or to members of the relationship group that were on the list of invitees (which, in embodiment in which none of the members of the relationship group are in the default list of invitees, are only those expressly added to the list of invitees at the request of the user and in another embodiment in which all of the members of the relationship group are in the default list of invitees, all of the members of the relationship groups except those expressly removed from the list of invitees). In step 714, the calendar information of the user is updated to include the event, by modifying the user information in tenant database 22, for example. In step 716, system 16 sends the update to the user.

In an embodiment, each of the steps of method 700 is a distinct step. In another embodiment, although depicted as distinct steps in FIG. 7, steps 702-716 may not be distinct steps. In other embodiments, method 700 may not have all of the above steps and/or may have other steps in addition to, or instead of, those listed above. The steps of method 700 may be performed in another order. Subsets of the steps listed above as part of method 700 may be used to form their own method.

User-Side Method of Scheduling an Event

Figure 8:
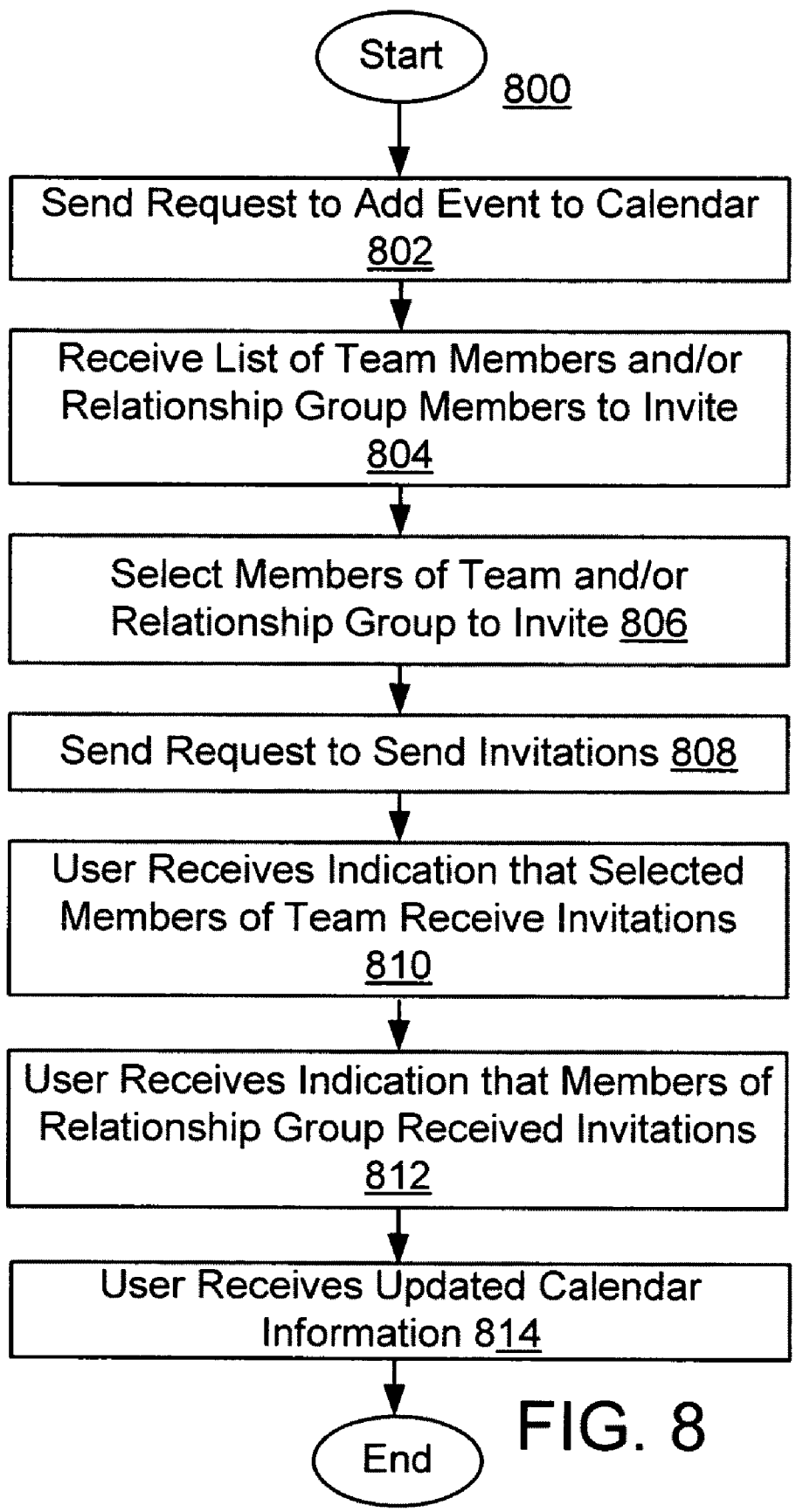
FIG. 8 shows a flowchart of an embodiment of a method of scheduling an event by the user.

FIG. 8 shows a flowchart of an embodiment of a method 800 of scheduling an event by the user. In step 802, the user may send a request to add an event to the user's calendar, which triggers the receiving and processing of the request in steps 702 and 704 (FIG. 7). In step 804, the user receives a list of default invitees, which may include team members and optionally relationship group members from system 16 as a result of the list being sent in step 704 (FIG. 7). In step 806, in response to step 804, the user may request changes to the list of invitees, and the changes to the list are sent from system 12 to system 16, which causes the changes to be received in step 708 (FIG. 7). In step 808, user system 12 sends a request to send invitations. In step 810, the user receives an indication that invitations were sent to the team members that were on the list of invitees. In step 812, the user receives an indication that invitations to the event were sent to the members of the relationship group that were on the list of invitees. In step 814, the user receives the updates to the calendar.

In an embodiment, each of the steps of method 800 is a distinct step. In another embodiment, although depicted as distinct steps in FIG. 8, steps 802-812 may not be distinct steps. In other embodiments, method 800 may not have all of the above steps and/or may have other steps in addition to, or instead of, those listed above. The steps of method 800 may be performed in another order. Subsets of the steps listed above as part of method 800 may be used to form their own method.

Sever-Side Method of Establishing a Relationship Group

Figure 9:
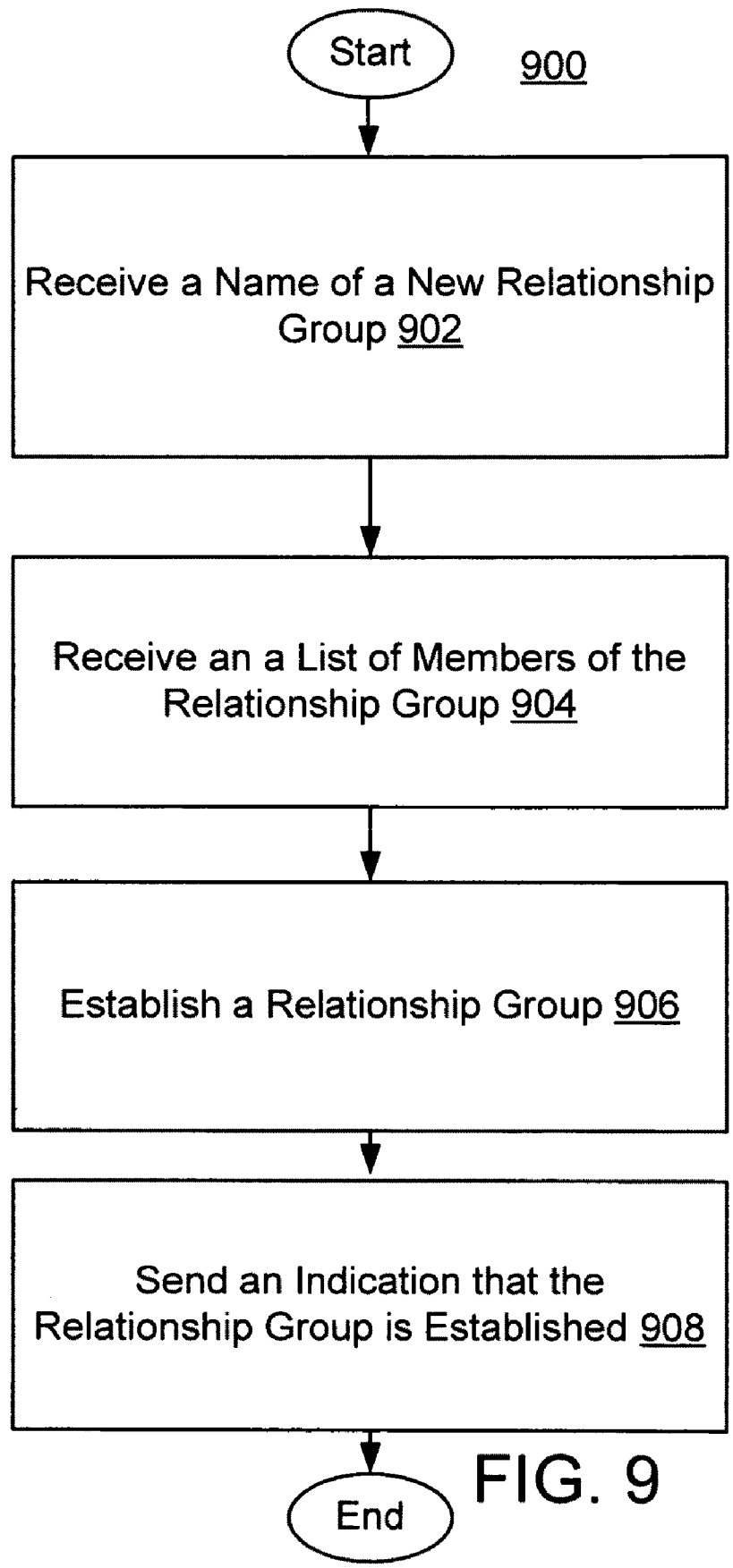
FIG. 9 shows a flowchart of an embodiment of a method of establishing a relationship group implemented at the server side.

FIG. 9 shows a flowchart of an embodiment of a method 900 of establishing a relationship group implemented at the server side. In step 902, system 16 receives from the user a name for a new relationship group. Optionally, in step 902, system 16 also receives from the user a description of the relationship group. In an embodiment, roles for the members of relationship group are received as part of step 902. In an embodiment, an assignment of a priority of one or more members of the relationship group is received as part of step 902. In an embodiment, an indication as to whether each member is included in a roll-up is also received as part of step 902. If the client (of the tenant) is included in the roll-up, the information of the client is aggregated with the relationship group, and if the client is not included in the roll-up the information of the client is not aggregated with the information of the relationship group. In an embodiment, the roll-up may aggregate all information (which may include financial information, activities, and other information, for example). In other embodiments, there may exist an option to roll up only certain types of information. Roll-up refers to any of the child objects of the individual being rolled up to the group. So in addition to financial information, this refers to activities as well. In step 904, system 16 receives from the user a list of members of the relationship group. In step 906, in response to steps 902 and/or 904, system 16 establishes a relationship group having the name received in step 902 and having the members received in step 904. In step 908, an indication that the relationship group was established is sent to the user.

In an embodiment, each of the steps of method 900 is a distinct step. In another embodiment, although depicted as distinct steps in FIG. 9, steps 902-908 may not be distinct steps. In other embodiments, method 900 may not have all of the above steps and/or may have other steps in addition to, or instead of, those listed above. The steps of method 900 may be performed in another order. Subsets of the steps listed above as part of method 900 may be used to form their own method.

User-Side Method of Establishing a Relationship Group

Figure 10:
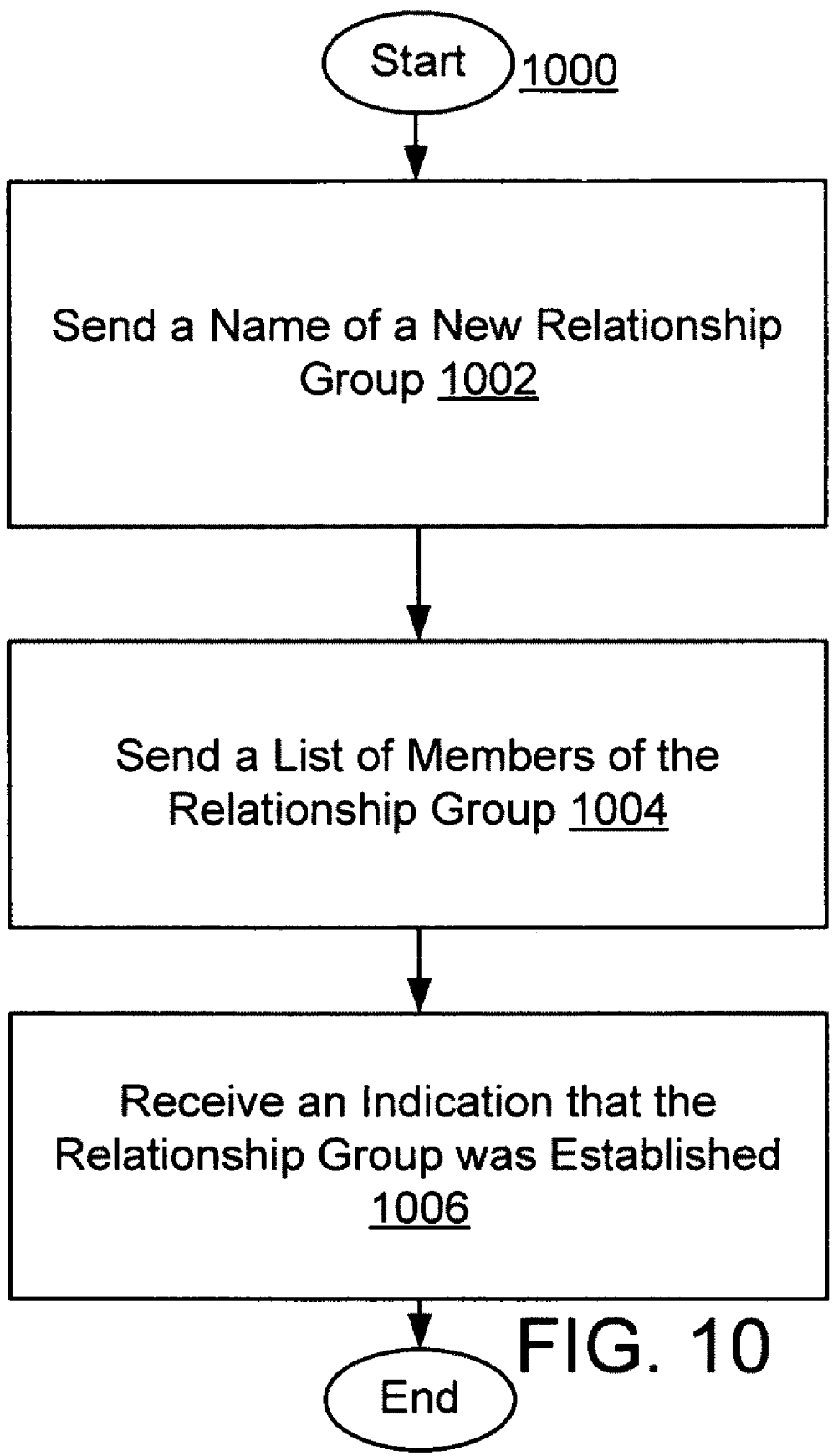
FIG. 10 shows a flowchart of an embodiment of a method of establishing a relationship group implemented at the user side.

FIG. 10 shows a flowchart of an embodiment of a method 900 of establishing a relationship group implemented at the user side. In step 1002, the user sends a name for a new relationship group to system 16 (the sending in step 1002 causes the receiving in step 902 of FIG. 9). Optionally, in step 1002, the use also sends a description of the relationship group to system 16. In step 1004, the user sends a list of members for the relationship group (the sending in step 1004 causes the receiving in step 904 of FIG. 9). In an embodiment, roles for the members of relationship group are sent from user system 12 to system 16 as part of step 1004. In an embodiment, an assignment of a priority of one or more members of the relationship group is sent form use system 12 to system 16 as part of step 1004. In an embodiment, an indication as to whether each member is included in a roll-up is also sent from user system 12 to user system 16 as part of step 1004. In step 1006, in response to step 908, the user receives an indication that the relationship group has been established (having the name sent in step 1002 and having the members sent in step 1004). In an embodiment, each of the steps of method 1000 is a distinct step. In another embodiment, although depicted as distinct steps in FIG. 10, steps 1002-1006 may not be distinct steps. In other embodiments, method 1000 may not have all of the above steps and/or may have other steps in addition to, or instead of, those listed above. The steps of method 1000 may be performed in another order. Subsets of the steps listed above as part of method 1000 may be used to form their own method.

FIGS. 11, 12, 15-22A, and 23-28 each include home tab 1102, relationship groups tab 1104, clients tab 1106, financial accounts tab 1108, holdings tab 1110, know your clients tab 1112, client interests tab 1114, WM assets tab 1116, reports tab 1118, dashboards tab 1120, and console tab 1122.

Home tab 1102 may include a link, which when selected, brings a user to the home page of the on-demand community. The home page is discussed further in conjunction with FIGS. 11-14. Relationship tag 1104 may include a link, which when selected, brings the user to a page where relationships between clients can be established, edited, and/or reviewed, which is discussed further in FIG. 15-18. Clients tab 1106 may include a link, which when selected, brings the user to a page where the user can add a new client, add the information for the new client, view client information and/or edit client information (which may be referred to as a clients page), which is discussed further in conjunction with FIGS. 19 and 20. Financial accounts tab 1108 may include a link, which when selected, brings the user to a page for reviewing and managing financial accounts data and activities. Holdings tab 1110 may include a link, which when selected, brings the user to page having data and tools for reviewing and managing holdings, which is discussed further in conjunction with FIG. 21. Know your clients tab 1112 may include a link which, when selected, brings the user to a page for reviewing available information about clients of the user, which is discussed further in conjunction with FIG. 22A. Client interests tab 1114 may include a link, which when selected, brings the user to page for tracking the securities a user may be interested in buying or selling, which is discussed in conjunction with FIG. 23. WM assets tab 1116 may include a link, which when selected, brings the user to one or more pages for creating repository of funds, stocks, and other securities that may be included in the holdings of a user's financial accounts. For example, the user can create a WM asset for the symbol "CRM," which is the salesforce.com company stock. Reports tab 1118 bring a user to one or more pages for viewing and compiling analyses of data associated with the features and/or functions of a wealth management system. Dashboards tab 1120 bring a user to one or more pages for generating customized reports and viewing charts based charts based on the reports, which is discussed in conjunction with FIG. 21. Console tab 1122, when selected, allows a user to view and edit client information and associated records via a multi-frame page interface, which is discussed in conjunction with FIG. 22.

FIGS. 11, 12, 15, 16, 19, and 20 each include search box 1124, search field 1126, go button 1128, limit to box 1130, create new menu 1132, shortcuts 1134, and recent items 1136.

Search box 1124 includes various graphical interface elements that assist in performing a search. Search field 1126 allows the user to enter search terms. Go button 1128 initiates a search for the search terms entered in search field 1124. Limit to box 1130 allows the user to limit the search to the user's items. Create new menu 1132 is a pull down menu with a list of items that the user may wish to create, such as a new client of the tenant, new relationship group, a new team, a new report, a new asset or holding for a client, and new event, and/or a new task. Shortcuts 1134 include one or more shortcuts to any of the various pages and/or other items. Recent items 1136 includes a list of the most recent locations (e.g., webpages) the current user has visited.

FIGS. 11, 13, 15B, 20, 21, 22A, 23, and 24 include recycle bin 1138, which stores deleted items, such as deleted clients, teams, and/or relationship groups.

Figure 11:
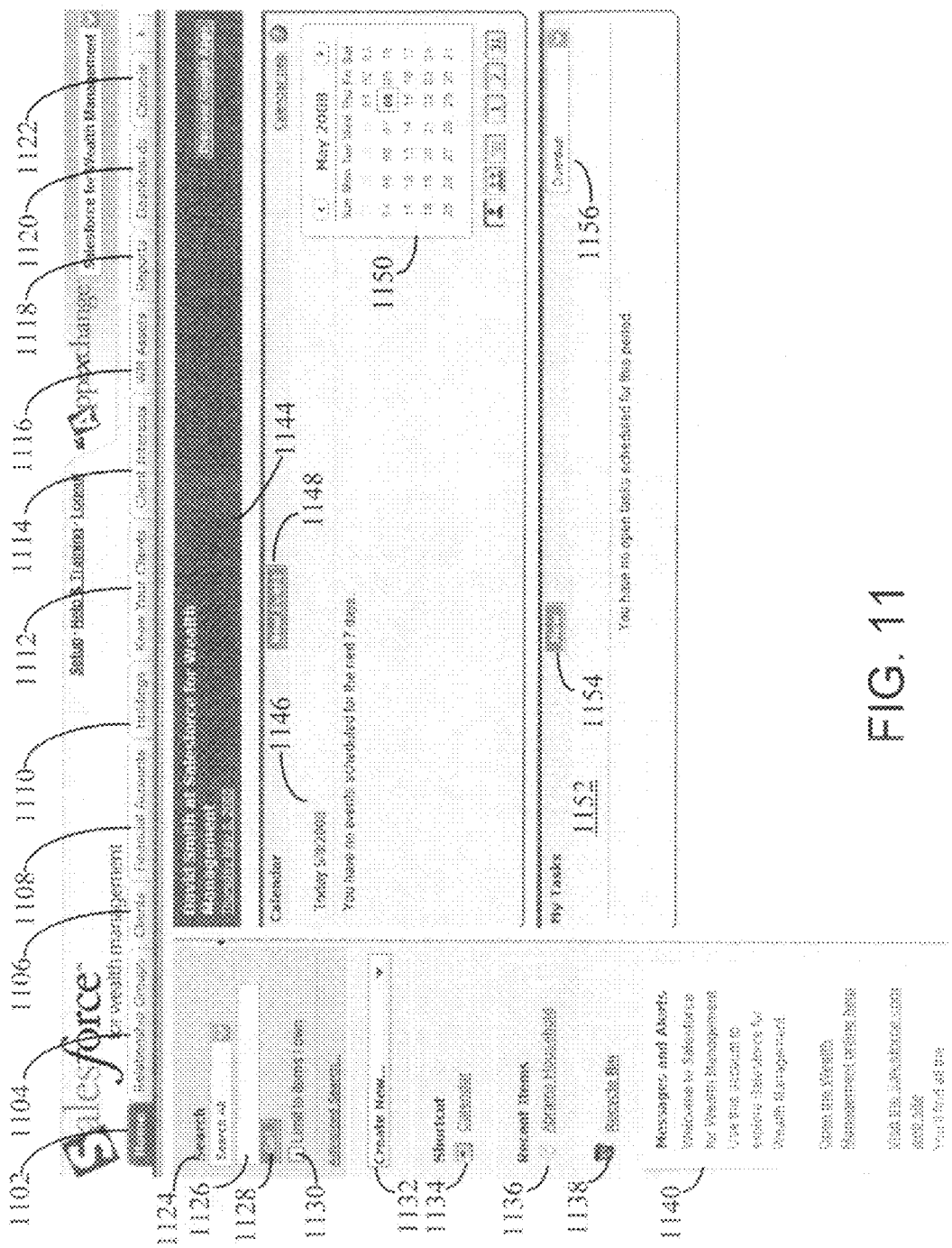
FIG. 11 is a screenshot of an embodiment of a homepage.

FIG. 11 is a screenshot of an embodiment of homepage 1100. Homepage 1100 includes message box 1140, heading box 1144, event box 1146, new event button 1148, calendar 1150, task box 1152, new task button 1154, and status indicator 1156. In other embodiments, homepage 1100 may not have all of the elements listed and/or may have other elements instead of or in addition to those listed.

Message box 1140 may display messages and/or links to messages for the user. Heading box 1144 includes information describing the information below the heading. In an embodiment, heading box 1144 includes the name of the current user, the date, and the role (e.g., management) of the user. Event box 1146 may include a list of upcoming events that the user scheduled. New event button 1148, when selected (e.g., clicked upon), may initiate a process for adding an event to the user's calendar. Calendar 1150 is the calendar of the current user, and may include indications of the dates of events and schedules tasks. Task box 1152 may include a list of tasks. New task button 1154, when selected (e.g., clicked upon) may initiate a process for scheduling a task. Status indicator 1156 when selected (e.g., clicked upon) may indicate the status of a task (e.g., overdue, due in one day).

Figure 12:
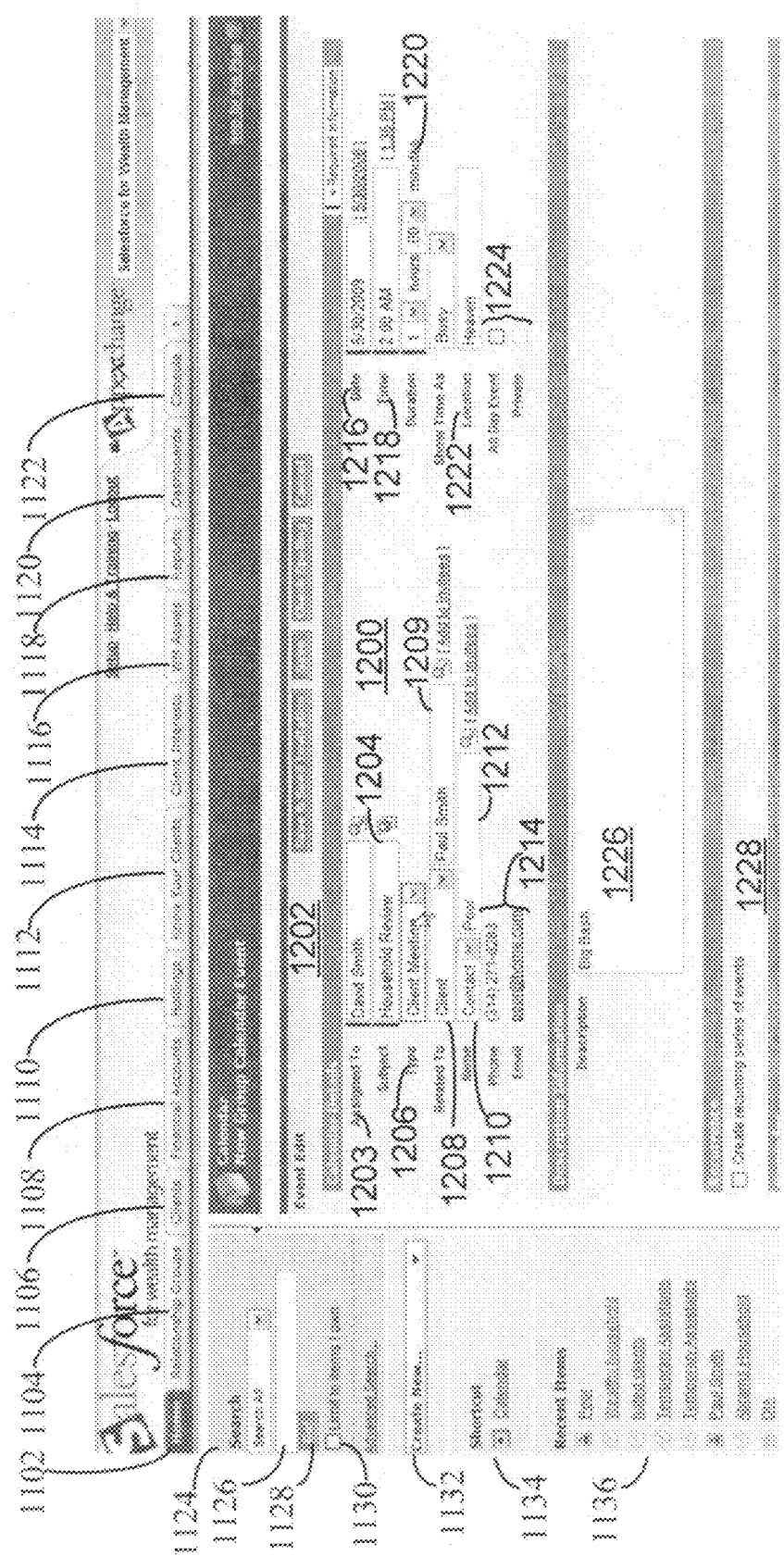
FIG. 12 shows an embodiment of a home webpage for scheduling an event.

FIG. 12 shows an embodiment a home webpage 1200 for scheduling an event. Home webpage 1200 may include scheduling box 1202, assigned to field 1203, subject field 1204, type field 1206, related to type 1208, related to name 1209, person type 1210, person name 1212, contact information 1214, date 1216, time 1218, duration 1220, location 1222, other event information 1224, description 1226, and recurrence 1228. In other embodiments, webpage 1200 may not have all of the elements listed and/or may have other elements instead of or in addition to those listed. In other embodiments, home webpage 1200 may not have all of the elements listed and/or may have other elements instead of or in addition to those listed.

Home webpage 1202 may be the top of a webpage for scheduling an event. Assigned to field 1203 may include the name of the user to whom the client associated with the event is assigned. Subject field 1204 may include a topic that will be discussed at the event being scheduled. Type field 1206 describes the type of event. In an embodiment, type field is a pull down menu that includes the options of client meeting, internal meeting, prospect, and other. Related to type 1208 may list a type of an item to which the event is related. For example, related to type 1208 may be contact, client, security, or another value indicating the type of person or item that to which the event is related. In an embodiment, related to fields includes a pull down menu that lists types of items and an identifier field that lists a specific item. For example, the pull down menu may allow the user to choose whether to select asset, campaign, case, client, client interest, contract, holding, know your client, opportunity, solution, VM asset, or other. Depending on the type of item selected from the pull down menu, a different set of items may be available to select between for second window of related to field 1208. Thus, if client is selected for the type of item, a list of clients system 16 may allows the user to selected one or a list of clients for the specific item that appears in the second field of related to type 1208. Related to name 1209 is the name of the item to which the item is related. Person type 1210 may list a type of person associated with the item listed in related to type 1208. Person type 1210 may include a pull down menu that may allow the user to select between whether a person is a contact (the primary person to contact from a relationship group or a company) or a lead (whom may or may not necessarily be part of the company or relationship group). Person name 1212 may include the name of the person that is the contact, lead, or other type of person indicated in person type 1210. Contact information 1214 may include contact information for the person listed in person name 1212, such as the phone number and/or e-mail address. In another embodiment, other types of contact information may be listed in addition to, or instead of, the e-mail address, and phone number, such an instant messaging address and/or post office address. Date 1216 is the date of the event. Time 1218 is the time of day of the start of the event. Duration 1220 is the length of time that the user expects to attend the event. Location 1222 is the location of the event. Other event information 1224 may include other event information, such as whether the event is an all day event or a whether the event is a private event. Description 1226 may include a field for entering a description of the event that is more detailed and/or describes other aspects of the event. Recurrence 1228 may include tools for setting the event as a periodically occurring event. If the user selects to make the event a recurring event (e.g., by checking a check box), the graphical user interface presents options for the user to indicate how frequently the event occurs (e.g., daily, every third business day, weekly, biweekly, monthly, annually, or at another period of occurrence).

Figure 15:
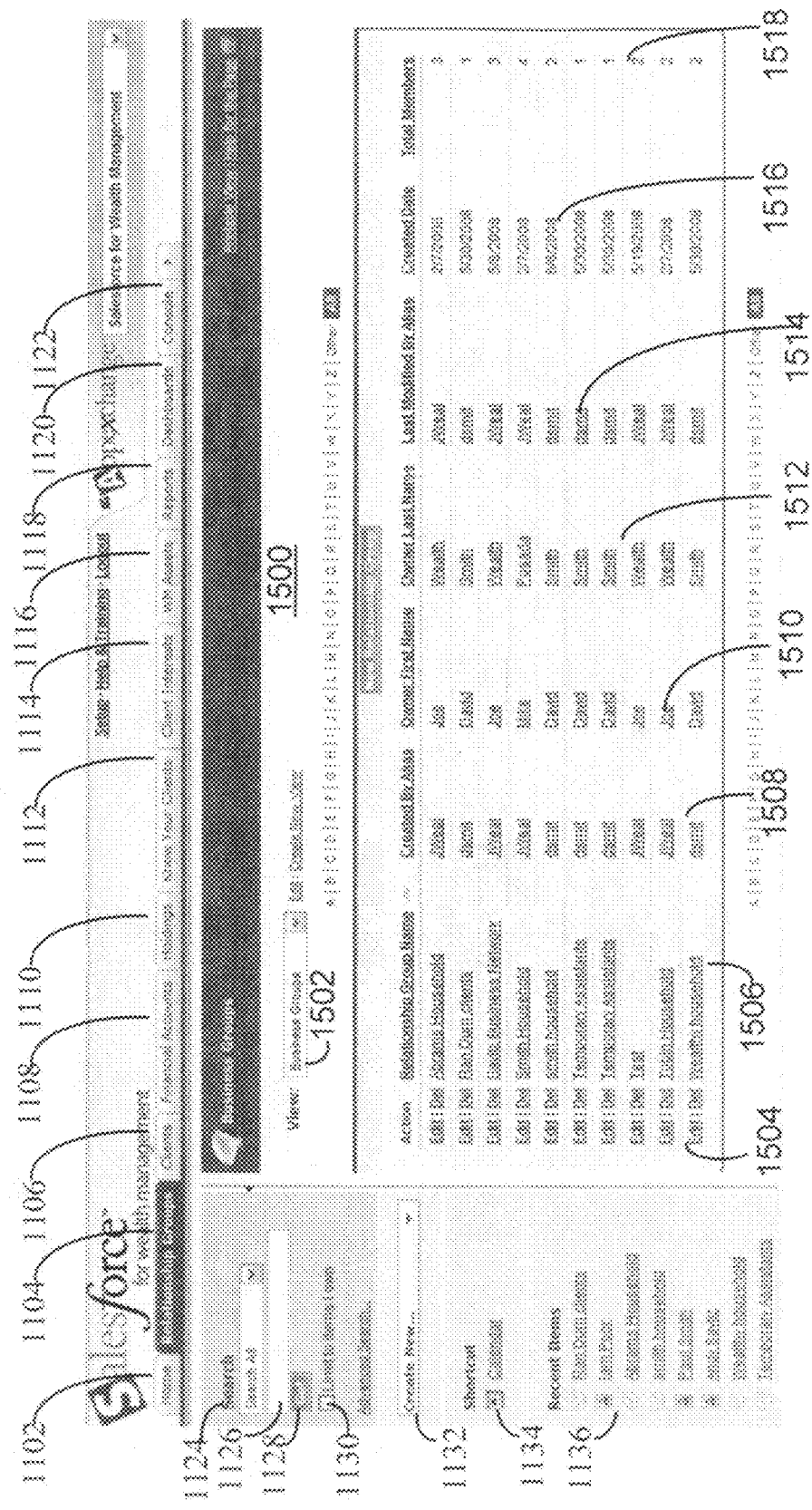
FIG. 15 shows a screenshot of an embodiment of a relationship webpage.
Figure 16:
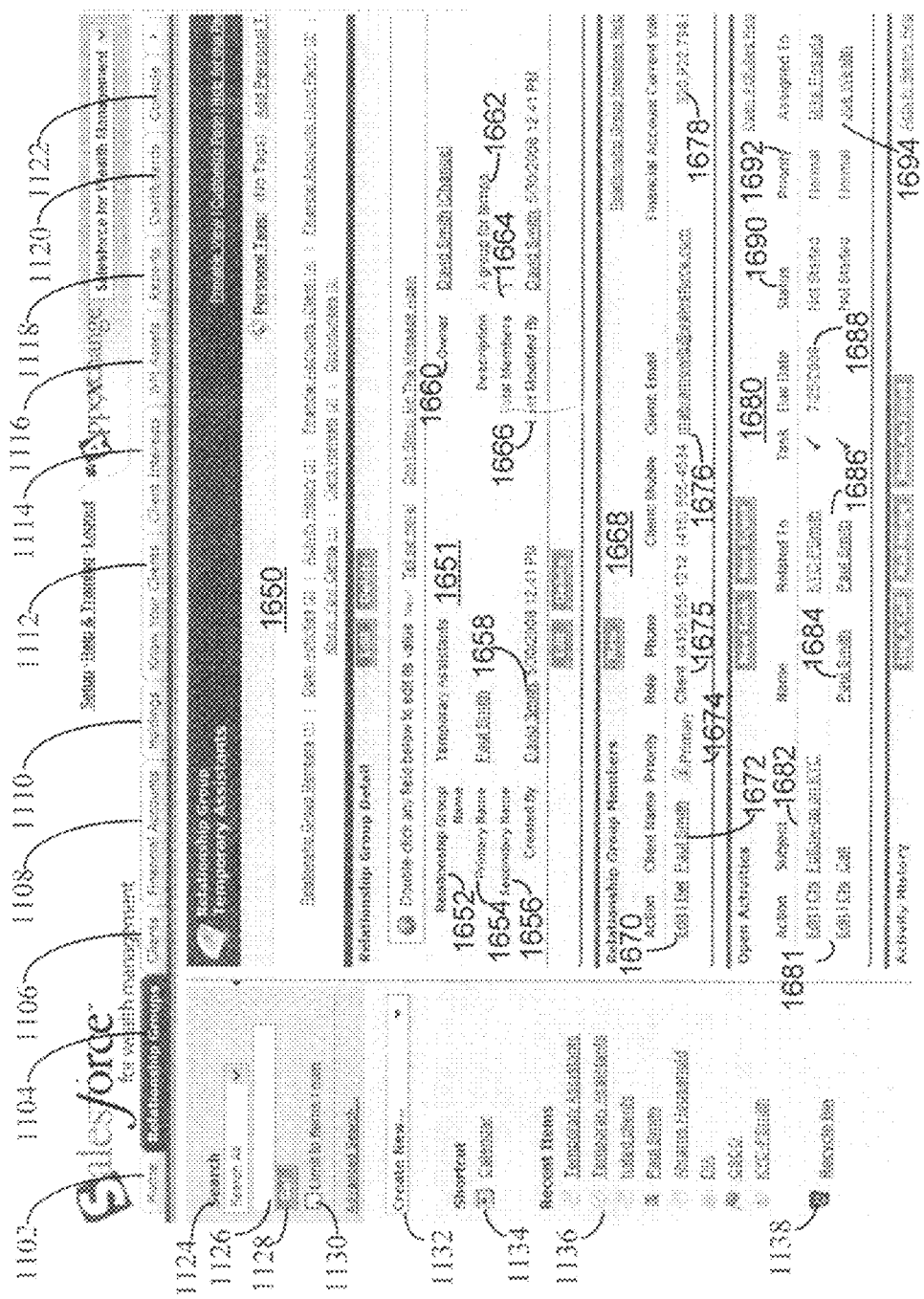
FIG. 16 shows a screenshot of an embodiment of the top of another relationship webpage.
Figure 17:
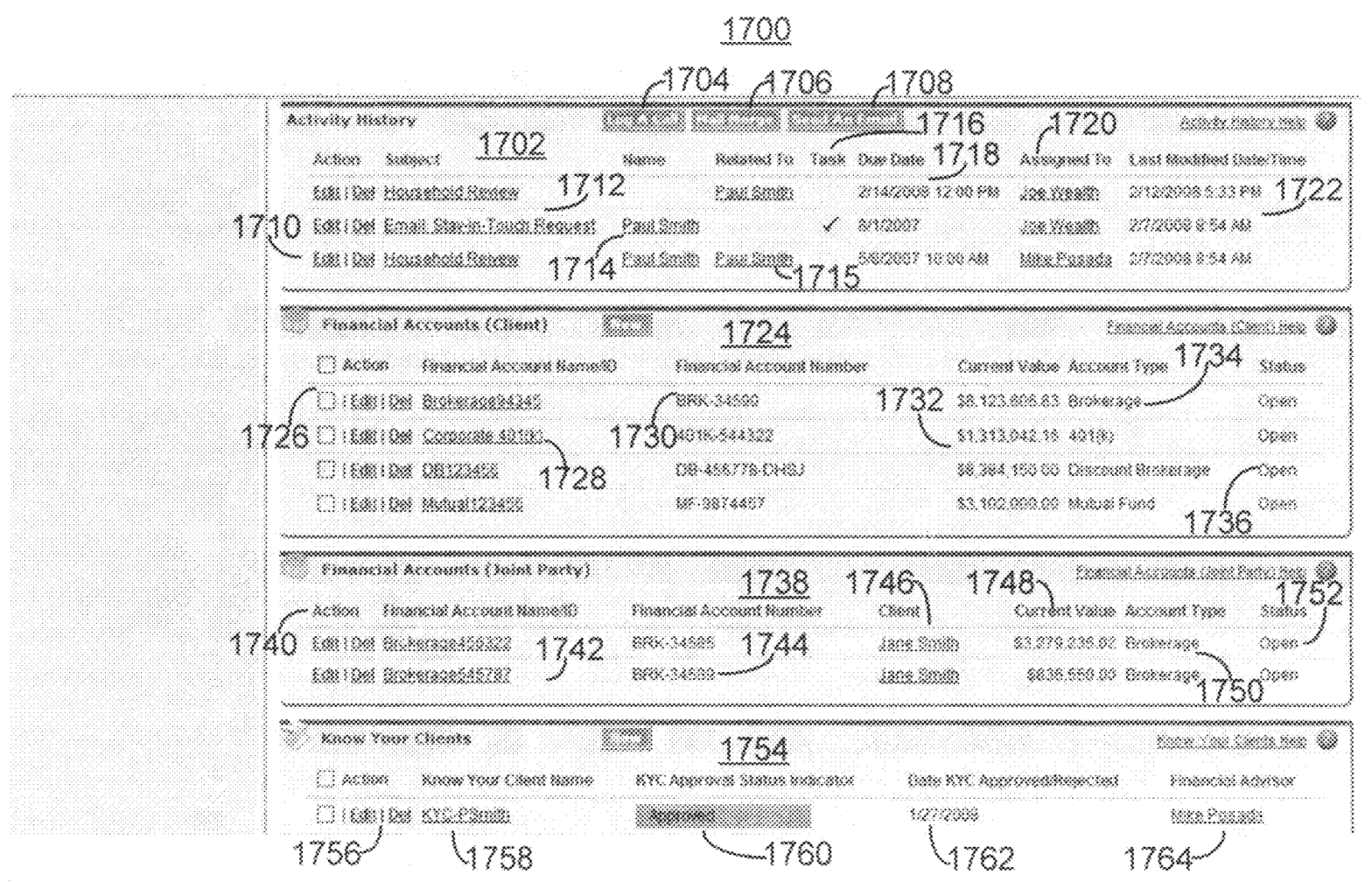
Figure 18:
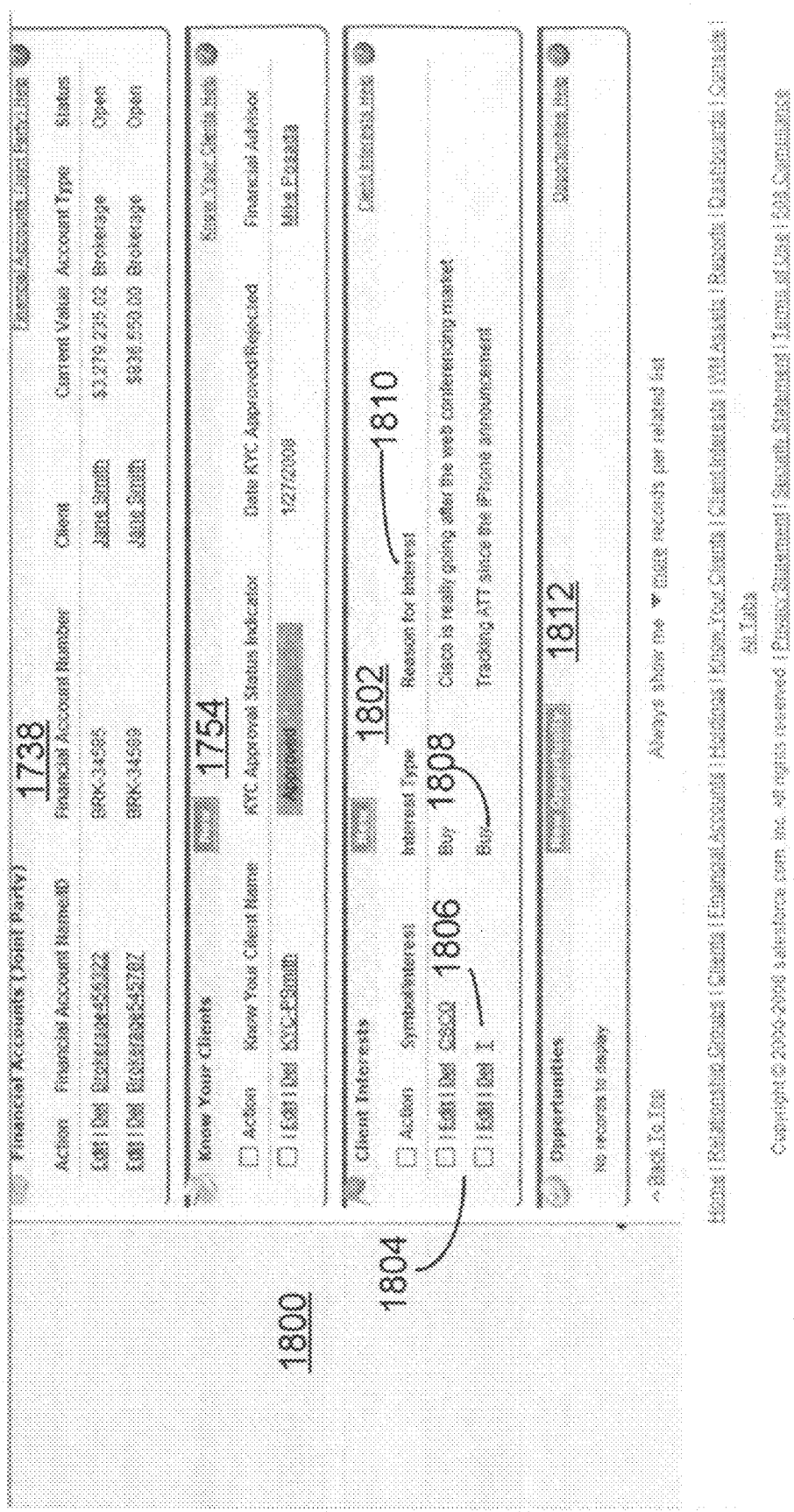
FIG. 18 shows a screenshot of an embodiment of the bottom of the relationship webpage of FIG. 16.

Regarding FIGS. 13 and 15-17, FIG. 13 has action 1304, FIG. 15 has actions 1504, FIG. 16 has actions 1670 and 1681, FIG. 17 has actions 1710, 1726, 1740, and 1756, and FIG. 18 has action 1804. The description of each of actions 1304, 1504, 1670, 1681, 1710, 1726, 1740, 1756, and 1804 is essentially the same, although the context of each is slightly different. Actions 1304, 1504, 1670, 1681, 1710, 1726, 1740, 1756, and 1804 are actions that may be applied to the record that is in the same line as the action listed. In other embodiments the features and functionalities listed above as part of FIGS. 13 and 15-17 may not have all of the elements listed and/or may have other elements instead of or in addition to those listed. In an embodiment, in each case the action column includes a link for removing the record on the same line, which is labeled "Remove," "Del," or "Cls," depending on the context. Additionally, where appropriate there is also a link labeled "Edit" for editing the record on the same line. Since the description of each of actions 1304, 1504, 1670, 1681, 1710, 1726, 1740, 1756, and 1804 is essentially the same, the description will not be repeated at each occurrence.

Figure 13:
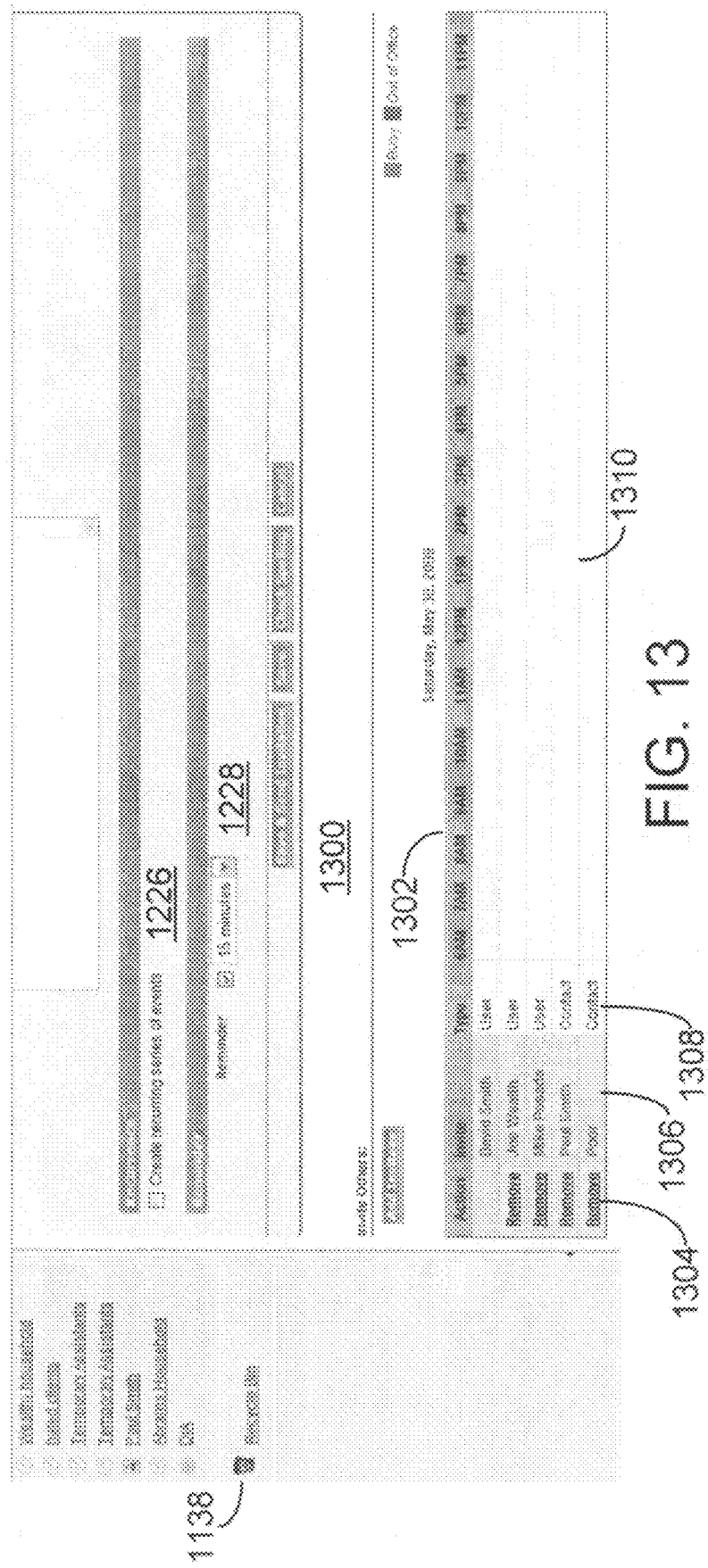
FIG. 13 shows the bottom portion of an embodiment of a home webpage for a wealth management site.

FIG. 13 shows the bottom portion 1300 of an embodiment of home webpage 1200. Bottom portion 1300 may include recurrence 1226, reminder 1301, schedule of invitees 1302, which may include action 1304, invite 1306, type of invite 1308, schedule, and time slots 1310. In other embodiments, bottom portion 1300 may not have all of the elements listed and/or may have other elements instead of or in addition to those listed.

Recurrence 1226 was discussed above in conjunction with FIG. 12. Reminder 1301 may include an option for setting reminders for the event scheduled via home webpage 1200. Schedule of invitees 1302 lists the schedules of the invitees. By comparing the schedules of the invitees the user may easily determine when there are the least number of conflicts or the most tolerable conflicts. Action 1304 was discussed just prior to FIG. 13. Invite 1306 may list the names of invitees. Certain invitees may automatically appear in invite 1306 as a default, because the invitee is part of a team that handles the item or client that is the subject of the event. Other invitees may be added to invite 1306. In an embodiment, if an invitee is appears in the list of invitees of invite 1306, in action 1304 the action of "remove," which facilitates removing the invitee, is available to the user for the invitee. Type of invitee 1308 may list the type of the invitee listed in invite 1306. For example, type of invitee 1308 may be a user, client, lead, or other type of invitee. Time slots 1310 may list the time slots of the invitees and whether or not the time slot is open. For example, a time slot of an invitee may be colored a first color, such as red (or another color), if the invitee will be on vacation or not be in the office for other reasons, and may be colored a second color, such as blue (or another color) if the invitee has another meeting. Since the user can see everyone's schedule simultaneously, scheduling meetings with fewer conflicts, with the fewest number of conflicts (or with no conflicts), or with the most tolerable conflicts is simplified.

Figure 14:
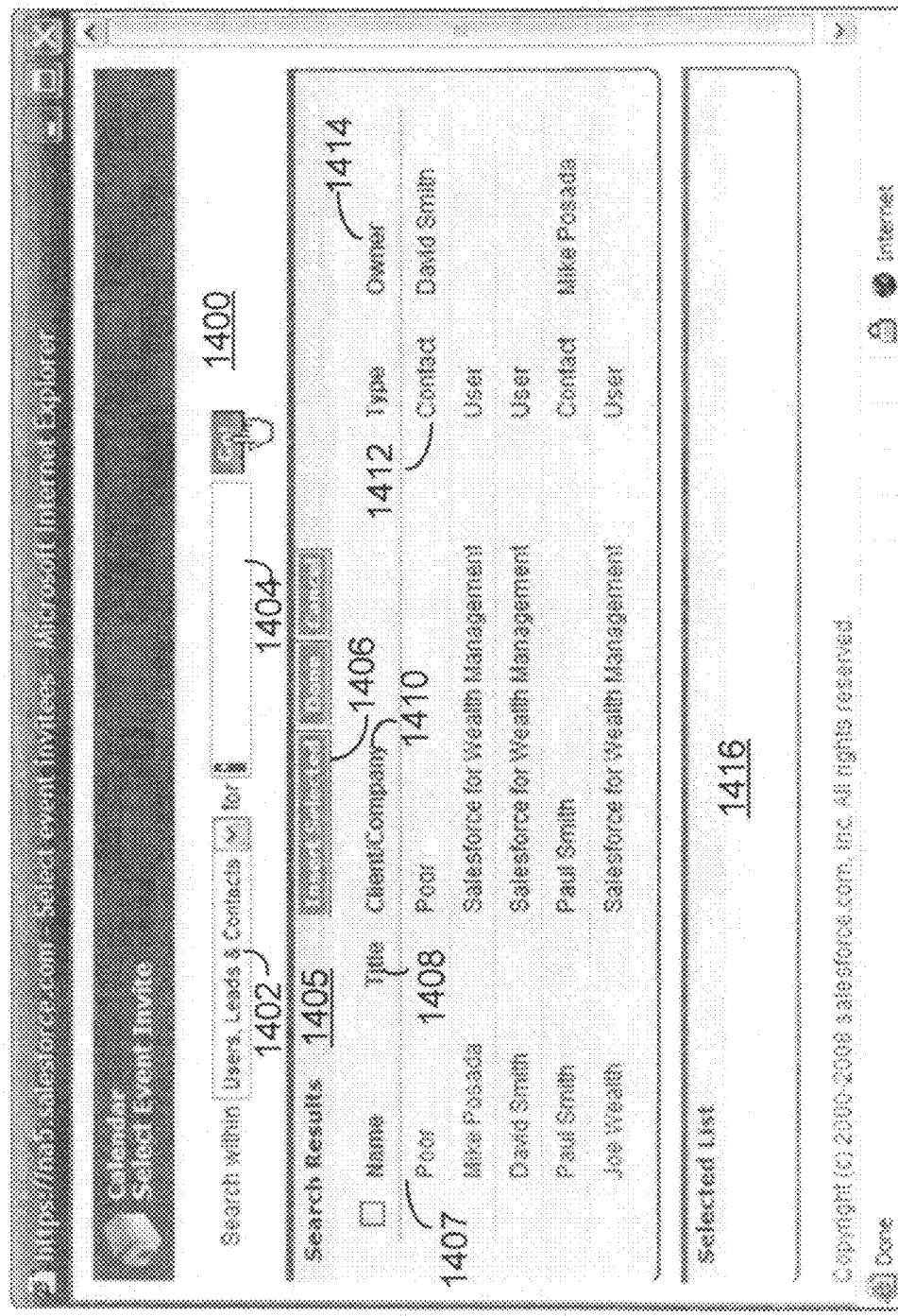
FIG. 14 shows an embodiment of a dialogue box for selecting invitees for an event.

FIG. 14 shows an embodiment of an dialogue box 1400 for selecting invitees for an event. Dialogue box 1400 may include search-within-field 1402, for-field 1404, search results 1405, insert selected 1406, name 1407, title 1408, client/company 1410, type 1412, owner 1414, and selected list 1416. In other embodiments, dialogue 1400 may not have all of the elements listed and/or may have other elements instead of or in addition to those listed.

Dialogue box 1400 may be used for searching for and selecting people to invite to an event, which were not included in the list of default people to invite to the event. Search-within-field 1402 may include a list of different types of invitees that the user may want to search for. For example, in an embodiment, search-within-field 1402 may include a pull down menu which may include a choice of different types of invitees, such as users; leads; contacts; users, leads, and contacts; and resources. For-field 1404 may allow the user to enter a specific character string that is expected to be within the name of the person searched for. In an embodiment, for-field 1404 may be left blank or a wild card character, such as an asterisk, may be entered to retrieve the entire list of people that are identified by the category selected by the within-filed 1402. Search results 1405 lists the people found as a result of the search conducted via search-within-field 1402 and for-field 1404. Insert selected 1406 is a link that causes a selected person to be added to a list of people to add to the list of invitees. Name 1407 is a list of names of invitees found by the search specified by within-filed 1402 and for-field 1404. Title 1408 is the title of the invitee (e.g., CEO or CFO). Client/company 1410 is the client of the tenant and/or company for whom the invitee works or is otherwise associated. Type 1412 is the type of the person listed. For example, type 1412 may be user, client, lead, or another type of person. Owner 1414 lists the user that is in charge of that person's accounts and/or assets. Selected list 1416 lists the people selected, via insert selected 1406, from search results 1405.

FIG. 15 shows a screenshot of an embodiment of a relationship webpage 1500. Relationship webpage 1500 may include view 1502, actions 1504, relationship group name 1506, created by 1508, owner first name 1510, owner last name 1512, last modified by 1514, created by 1516, and number of members 1518. In other embodiments, relationship webpage 1500 may not have all of the elements listed and/or may have other elements instead of or in addition to those listed.

Relationship webpage 1500 displays a list of relationship groups. View 1502 is a field that may be used to specify a type of relationship group. All of the relationship groups listed in relationship webpage 1500 are of the type specified by view 1502. Action 1504 was discussed just before the discussion of FIG. 13. Relationship group name 1506 is a list of names of relationship groups. Created by 1508 lists the names of the users that created the relationship group. Owner first name 1510 is the list of the first names of the users responsible for the relationship groups. Owner last name 1512 is the list of the last names of the users responsible for the relationship groups. Last modified by 1514 lists the user that last modified the relationship group. Created date 1516 list the dates that the relationship groups were created. Number of members 1518 lists the number of members in the relationship group. Optionally the date that the relationship group was last modified may also be listed. Selecting on of the relationship groups (e.g., by clicking on the relationship group twice quickly) causes a page to be displayed that lists details about the relationship group.

FIG. 16 shows a screenshot of an embodiment of the top of a relationship webpage 1600. Top of relationship webpage 1600 may include relationship group details 1651, which may include group name 1652, primary name 1654, secondary name 1656, created by 1658, owner 1660, description 1662, total members 1664, last modified 1666, relationship group members 1668, actions 1670, client name 1672, priority 1674, role 1675, contact information 1676, and account value 1678. top of relationship page 1600 may also include open activities 1680, actions 1681, subject 1682, name 1684, related to 1686, task 1687, due date 1688, status 1690, priority 1692, assigned to 1694. In other embodiments, relationship webpage 1600 may not have all of the elements listed and/or may have other elements instead of or in addition to those listed.

Top of relationship webpage 1600 may be the top portion of screenshot of a webpage that displays information related to relationship groups. By selecting (e.g. double clicking twice quickly) one of the relationship groups listed on relations webpage 1500, the user is brought to the webpage associated with top of relationship webpage 1600. Relationship group details 1651 is a box that specifies details about the relationship group that are similar to the details provided for that relationship group on relationship webpage 1500. Group name 1652 is the name of the relationship group. Primary name 1654 is the name of the primary member of the relationship group. Secondary name 1656 is the name of a secondary name of the relationship group. Primary and secondary may be tow priority levels. In other embodiments there may be other priority levels. Created by 1658 lists the user that created the relationship group. Owner 1660 is the user responsible for the relationship group. Description 1662 is a description of the relationship group. Total members 1664 is the number of members in the relationship group. Last modified 1666 lists the dates at which the relationship group was created. Relationship group members 1668 lists the names of members of the relationship group. Action 1670 was discussed just after FIG. 13. Client name 1672 is the name of a relationship group member. Priority 1674 is an indication as whether the group member of that line is a primary group member or a secondary group member. Role 1675 is the role of the group member with the relationship group. Contact information 1676 is the contact information of the group member, which in an embodiment, may include a phone number of a land line, a mobile phone number and/or an e-mail address. Account value 1678 lists the value of the account of the user.

Open activities 1680 is a box that lists activities that are open that are related to the relationship group of the webpage associated with top of relationship webpage 1600. Some examples of tasks that might be listed in open activities 1680 if not yet complete, are calling a client that is a member of the relationship group or scheduling a meeting with a client of the relationship group. Actions 1681 was discussed in conjunction with other actions before FIG. 13. Subject 1682 lists links to a description of the subject of the activity that is open, and/or describes the activity that is open. Name 1684 is the name of the client (if any) to which the open activity relates. Related to 1686 is an item to which the open activity is related. For example, task 1687 is an indication as to whether the open activity is a task. Due date 1688 is a list of dates when the activities are due. Status 1690 indicates the status of the open activity, such as not started, started, or completed. Priority 1692 indicates the priority of the open activity, such as urgent, high, normal, or low. Assigned to 1694 indicates the user to whom the open activity is assigned.

FIG. 17 shows a screenshot of an embodiment of the middle of relationship webpage 1700. Middle of relationship page 1700 may include activity history 1702, log a call 1704, mail merge 1706, send an e-mail 1708, action 1710, subject 1712, name 1714, related to 1715, task 1716, due date 1718, assigned to 1720, last modified 1722, financial accounts (client) 1724, action 1726, financial account name/ID 1728, financial account number 1730, current value 1732, account type 1734, status 1736, financial accounts (joint) 1738, action 1740, financial account name/ID 1742, financial account number 1744, client 1746, current value 1748, account type 1750, status 1752, know your clients 1754, action 1756, know your client name 1758, KYC approval indicator 1760, date KYC approved/rejected 1762, and financial advisor 1764. In other embodiments, middle relationships page 1700 may not have all of the elements listed and/or may have other elements instead of or in addition to those listed.

Middle of relationship page 1700 is the bottom of the same relationship webpage as shown in FIG. 16. Activity history 1702 is a box that contains records of the history of the activities. Log a call 1704 is a link that opens a page for entering a log of a phone call. Mail merge 1706 is a link that brings a user to a page that includes a template for a document. Send an e-mail 1708 is a link that initiates opening an input form for entering text that will be sent as an e-mail message. Action 1710 was discussed in conjunction above before FIG. 13. Subject 1712 is the subject of the activity. For example, subject 1712 may be household review, call a client, buy an asset, or any of a number of other subjects. Any type of activity listed in open activities may also be listed in subject 1712, except open activities 1680 lists the activity while the activity is open and, subject 1712 lists the activity after the activity is closed. Name 1714 is the name of the client (if any) to which subject 1712 pertained. Related to 1715 lists a client to which subject 1712 pertains. Task 1716 indicates whether the activity of subject 1712 is a task (the activity could be an event or other activity, for example). Due date 1718 is the date at which the activity of subject 1712 is due. Assigned to 1720 is the user that is responsible for the activity of subject 1712. Last modified 1722 lists the date at which the activity of subject 1712 was modified.

Financial accounts (client) 1724 is a box in which the financial accounts of the client are listed. Action 1726 will be discussed after the discussion of FIG. 18. Financial account name/ID 1728 is the name or ID of the account. Financial account number 1730 is the number associated with the account. Current value 1732 is the current value of the account. Financial account type 1734 is a type of the financial account. For example, financial account type 1734 may be brokerage, 401K, mutual fund, or other account type. Status 1736 is the status of the account. For example, status 1736 may be open, closed, or other status. Financial accounts (joint) 1738 are accounts that the client shares with other member of the relationship group.

Action 1740 was discussed just prior to FIG. 13. Financial account name/ID 1742, financial account number 1744, client 1746, current value 1748, account type 1750, and status 1752 have the same description as financial account name/ID 1728, financial account number 1730, current value 1732, financial account type 1734, and status 1736, respectively, which were described in the prior paragraphs.

Know your clients 1754 is a box that lists personal information about a client that is member of the relationship group. Action 1756 was discussed just prior to FIG. 13. Know your client name 1758 is the name of a link to personal information about a member of the relationship group. KYC approval indicator 1760 indicates whether the information in know your client name 1758 has been approved (e.g., by the client and/or a supervisor of the user). Date KYC approved/rejected 1762 lists the date that know your client name 1758 was approved. Financial advisor 1764 is the user that serves as the financial advisor for the client of know your client name 1758.

FIG. 18 shows a screenshot of an embodiment of the bottom of relationship webpage 1800. Bottom of relationship page 1800 may include financial accounts 1708, know your clients 1710, client inters 1802, action 1804, symbol/interest 1806, interest type 1808, reasons for interest 1810, and opportunities 1812. In other embodiments, bottom relationships page 1800 may not have all of the elements listed and/or may have other elements instead of or in addition to those listed.

Bottom of relationship page 1800 is the bottom of the same relationship webpage as shown in FIG. 16. Financial accounts 1708 and know your clients 1710 were discussed in conjunction with FIG. 17, above. Client interest 1802 is a box that shows the financial interest of the client, such as which assets the client would like to buy and/or sell. Action 1804 was discussed above before the discussion of FIG. 13. Symbol/interest 1806 is representations of an asset that the client has an interest in. For example, symbol/interest may include the symbols that represent a stock that the client wants to buy or sell. Interest type 1808 describes the type of interest the client has in the asset listed in symbol/interest 1806. For example, interest type 1808 may indicate whether the client wants to sell or buy the asset listed in symbol/interest 1806. Reasons for interest 1810 describes the reason why the client in interested in the asset. For example, if the asset is oil futures, the reason for the interest might be growth in the China's consumption of oil. Opportunities 1812 is a box that lists opportunities, such as sales leads.

Figure 19:
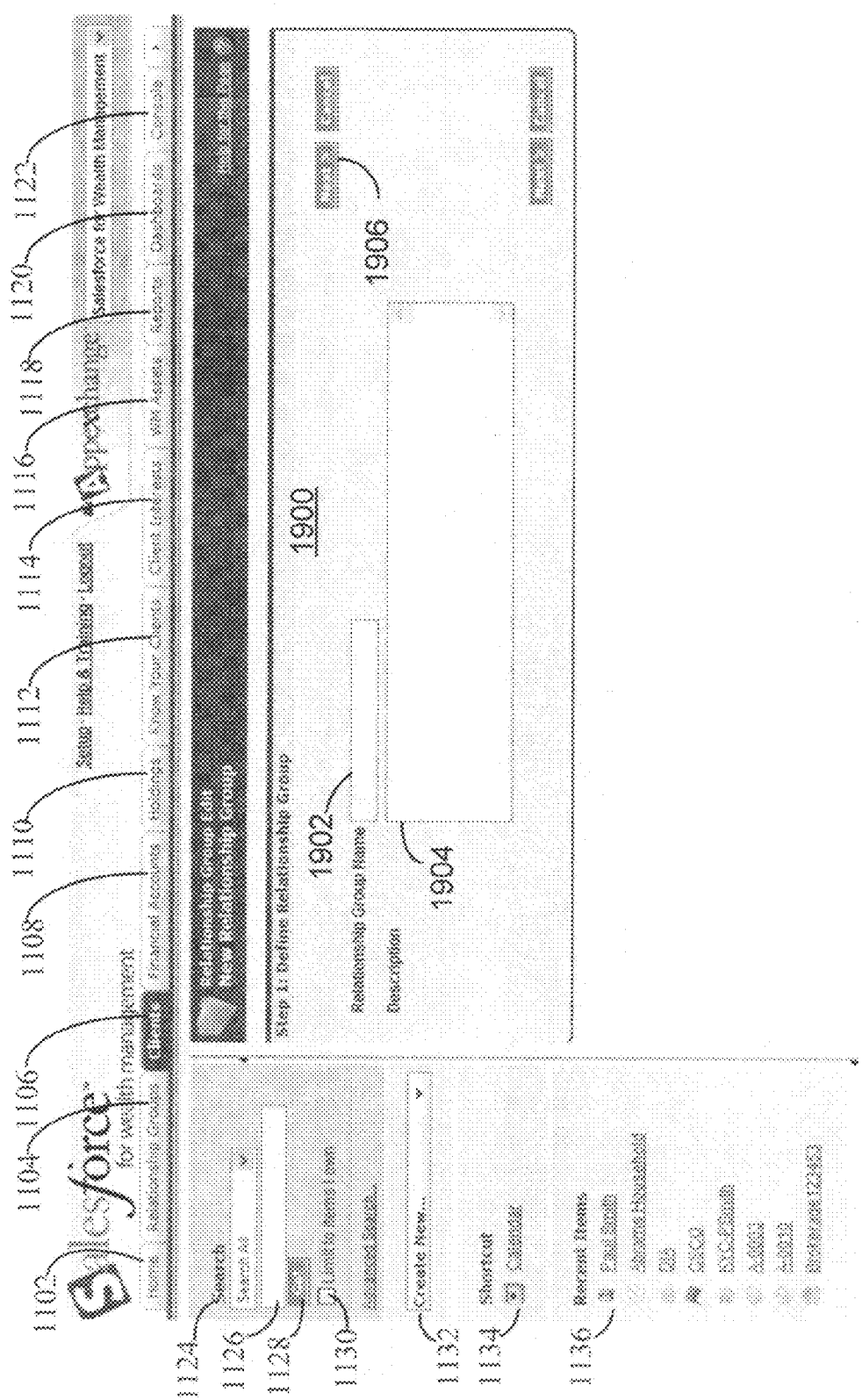
FIG. 19 shows a screenshot of an embodiment of a webpage for a first step of creating a relationship group.

FIG. 19 shows a screenshot of an embodiment of a webpage for a first step 1900 of creating a relationship group. First step 1900 may include relationship name 1902, description 1904, and next button 1906. In other embodiments, first step 1900 may not have all of the elements listed and/or may have other elements instead of or in addition to those listed.

Relationship name 1902 is a field for entering the name of the relationship group. Description 1904 is a field for entering a description of the relationship. Next button 1906 cause the webpage for the next step to be displayed.

Figure 20:
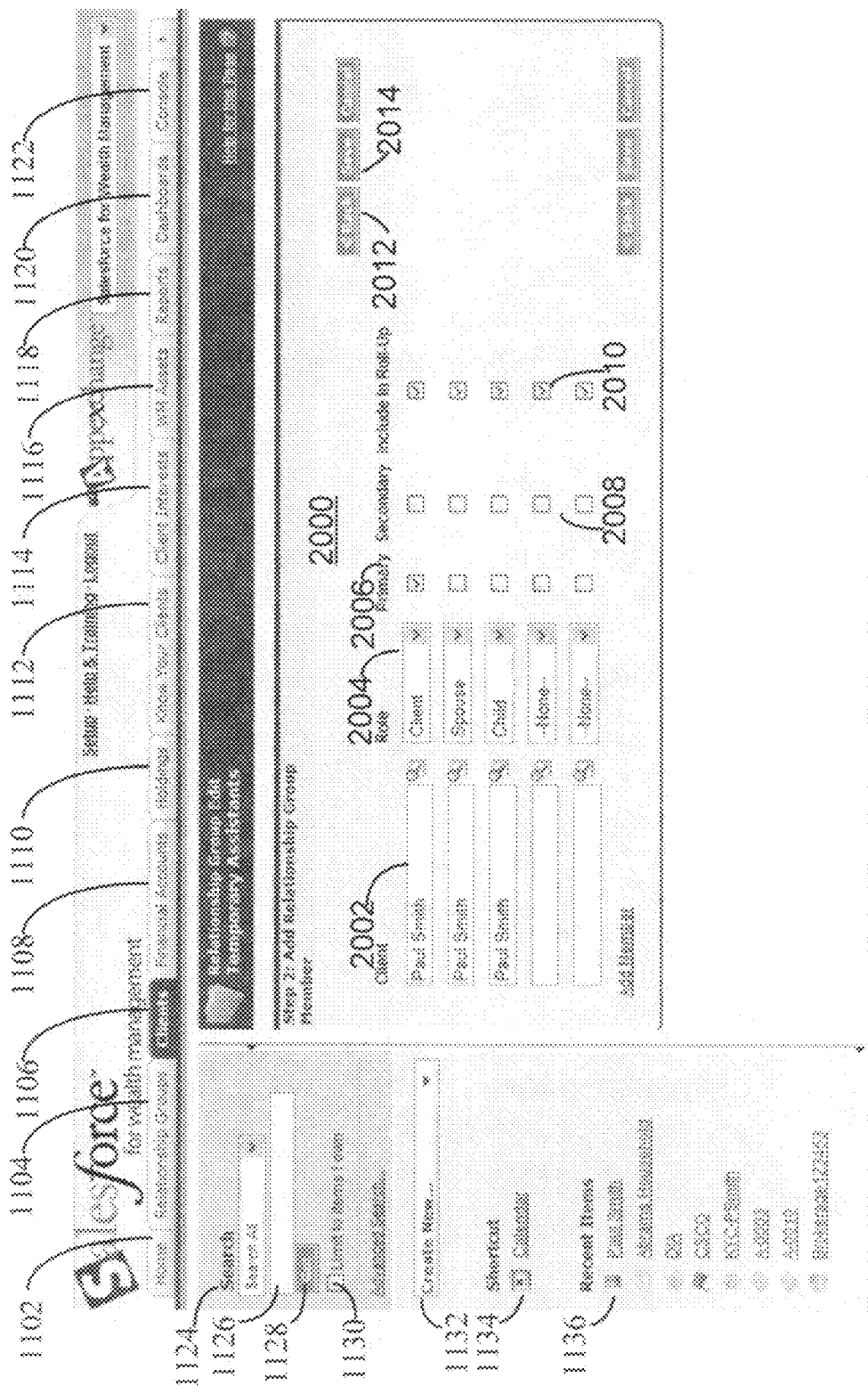
FIG. 20 shows a screenshot of an embodiment of a webpage for a second step of creating a relationship group.

FIG. 20 shows a screenshot of an embodiment of a webpage for a second step 2000 of creating a relationship group. Second step 2000 may include client 2002, role 2004, primary 2006, secondary 2008, include-in-roll-up 2010, back 2012, and save 2014. In other embodiments, second step 2000 may not have all of the elements listed and/or may have other elements instead of or in addition to those listed.

Second step 2000 is the second step carried out by the user for creating a relationship group. Client 2002 is a field where the user enters a clients name to add the client to the relationship group. Role 2004 is a field where the user designates the role of the client within the relationship group. For example, for a household the roles may be spouse, child, or client, whereas for an investment group, the roles might be president and member. Primary 2006 is a field that indicates whether the priority of the client is that of a primary member of the group. Secondary 2008 is a field that indicates whether priority of the client is that of a secondary member of the group. Include-in-roll-up 2010 is a field that indicates whether the client is included in a roll-up. As mentioned above, if the client (of the tenant) is included in the roll-up the information of the client is aggregated with the information of the relationship group, and if the client is not included in the roll-up the information of the client is not aggregated with the information of the relationship group. Back 2012 is a link that returns the user to the previous step, and save 2014 is a link that saves and thereby creates the relationship group.

Figure 21:
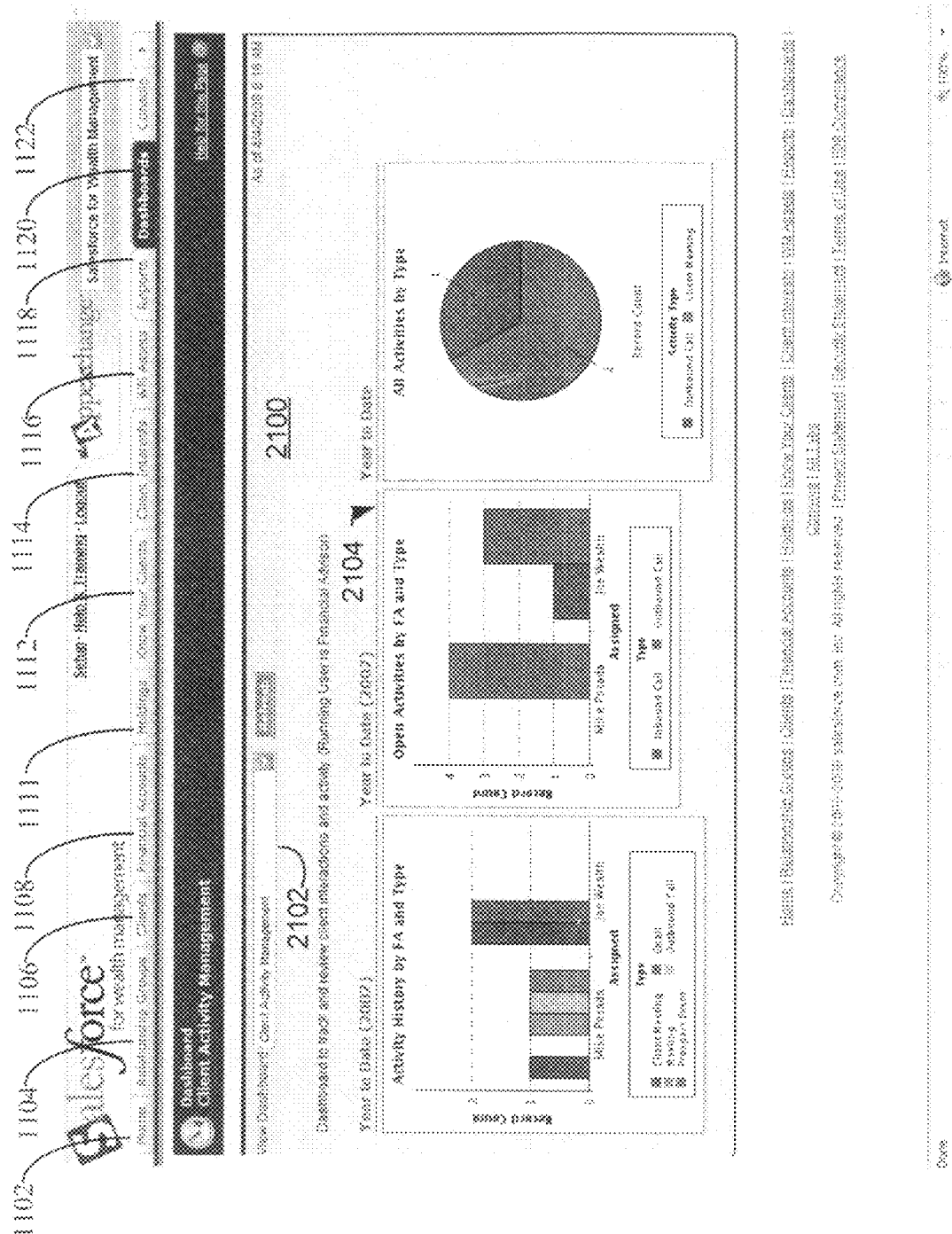
FIG. 21 shows a screenshot of an embodiment of a dashboard webpage.

FIG. 21 shows a screenshot of an embodiment of a dashboard webpage 2100. Dashboard webpage 2100 may include dashboard webpage 2102 and charts 2104. In other embodiments, webpage 2100 may not have all of the elements listed and/or may have other elements instead of or in addition to those listed.

Dashboard webpage 2100 provides a summary of aspects of the wealth management website. Dashboard view 2102 determines which part of the wealth management website is summarized, and charts 2104 are a collection of charts, such as pie charts and bar graphs summarizing the part of the wealth management website determined by dashboard view 2102. In an embodiment, dashboard view 2102 may set to any one of client management, client activity management, client interests, client accounts, client holdings, financial accounts, financial advisor, lead advisor, and know your client.

Figure 22:
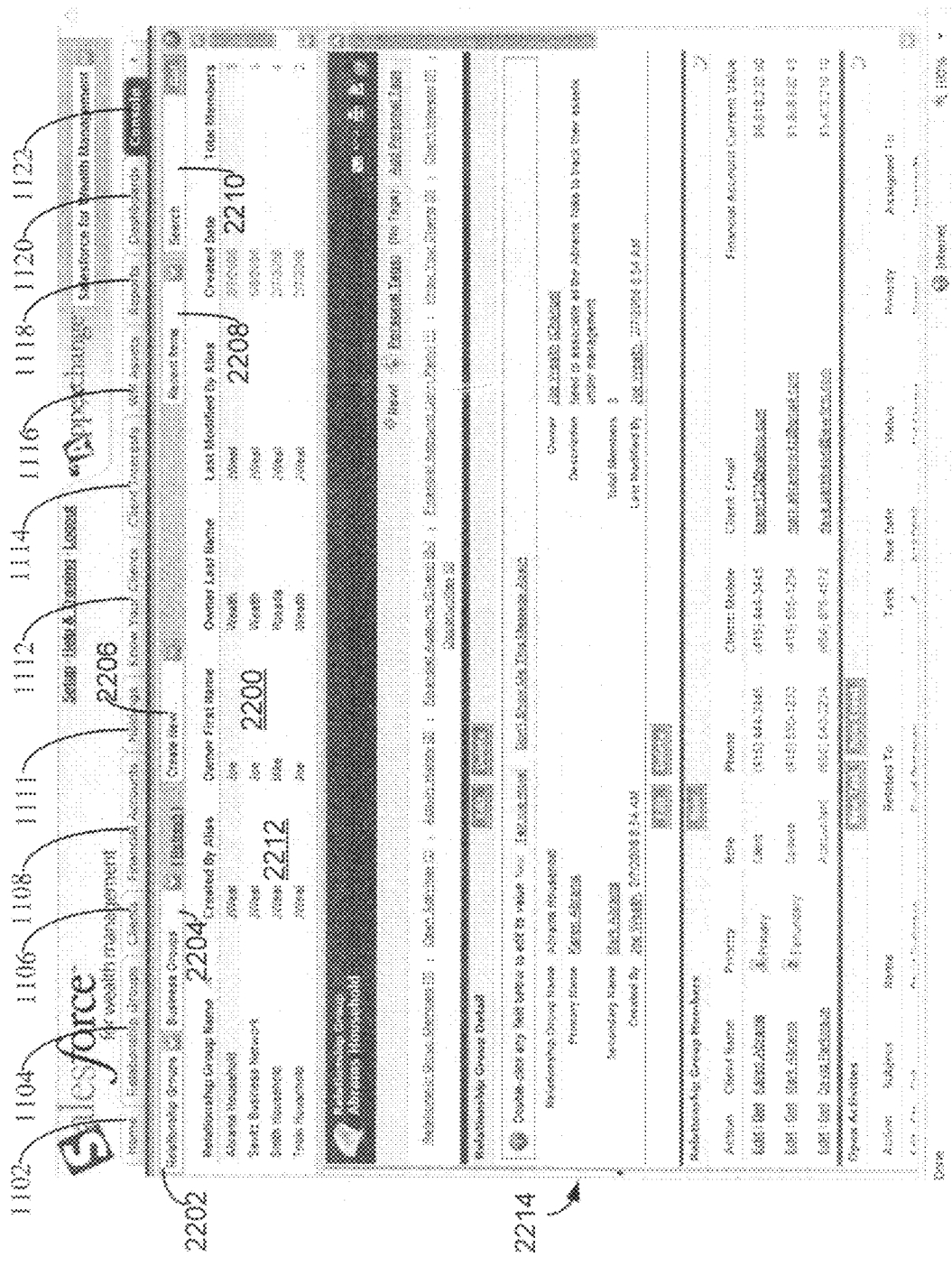
FIG. 22 shows a screenshot of an embodiment of a console webpage.

FIG. 22 shows a screenshot of an embodiment of a console webpage 2200. Console webpage 2200 includes category 2202, subcategory 2204, create new 2206, recent items 2208, and search 2210, summary region 2212, and details 2214. In other embodiments, console webpage 2200 may not have all of the elements listed and/or may have other elements instead of or in addition to those listed.

Console webpage 2200 allows the user to quickly access much of the information available via selecting tabs 1102-1122. Category 2202 is a pull down menu that lists different categories of information that may be viewed. For example, some of the categories may be clients, activities, financial accounts, relationship groups, clients' interests, and/or know your client. In an embodiment there may be a different category for each of the more commonly used tabs for all of the tabs. Subcategory 2204 is subcategory of category 2202. Depending on which category is selected, different subcategories are available. Create new 2206 is essentially the same as create new 1132, which was described prior to FIG. 11. Recent items 2208 are items that were recently accessed. Selecting recent items 2208 causes a pull down menu to be displayed that lists items that were accessed recently. Search 2210 is a field for entering a search term for searching for a webpage element and/or client information and performing a search. Summary region 2212 includes a summary of the items that fall into subcategory 2204. For example, if category 2202 is set to relationship groups and subcategory 2204 is set to households, a listing of links to all of the household relationship groups may be displayed. Details 2214 provides details of a particular item listed in summary region 2212. For example, details 2214 may display a series of windows, each corresponding to a different type of information about the item. Each category 2202 may have a different set of windows displaying different types of information. For example, relationship groups may have a window for opportunities, financial holdings, accounts, the clients' financial interests, the clients' personal interests, open activities, a history of activities, and/or other windows.

Method for Using the Environment (FIGS. 1 and 2)

Figure 23:
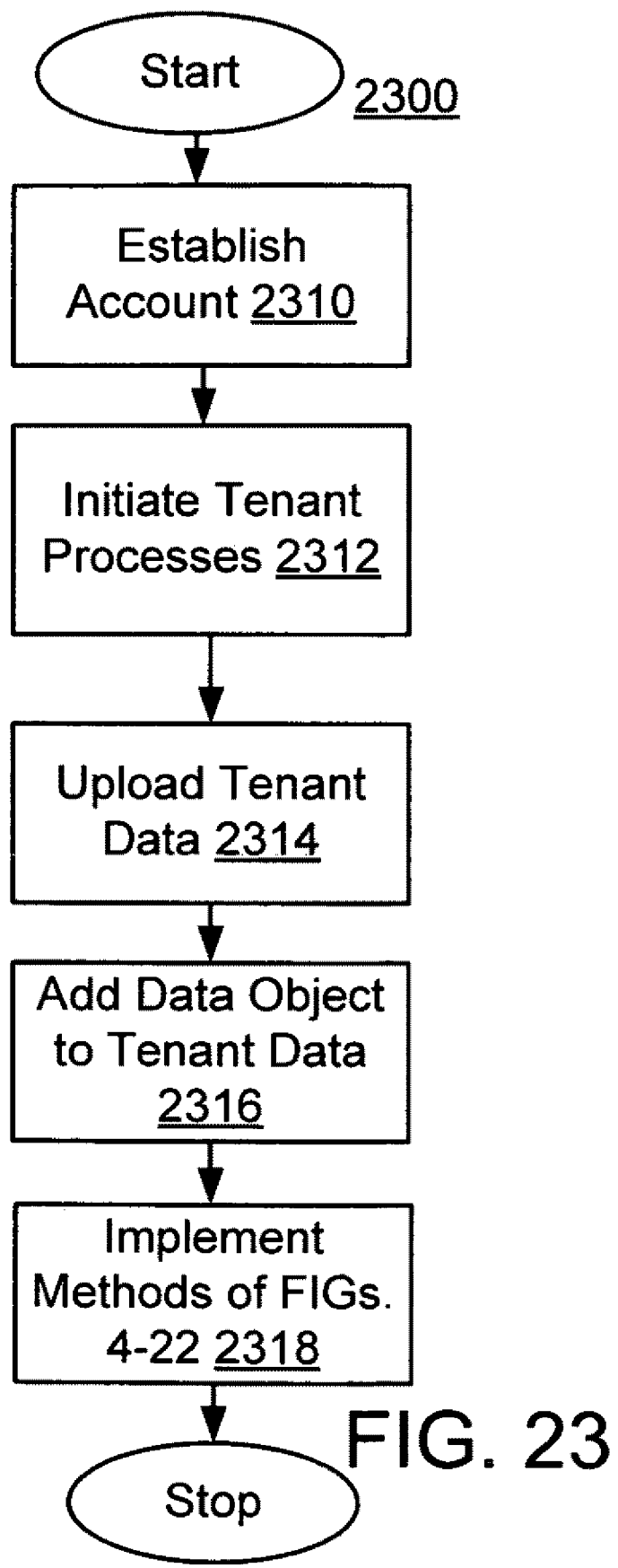
FIG. 23 shows a flowchart of an example of a method of using the environment of FIGS. 1 and 2.

FIG. 23 shows a flowchart of an example of a method 2300 of using environment 10. In step 2310, user system 12 (FIGS. 1 and 2) establishes an account. In step 2312, one or more tenant process space 104 (FIG. 2) are initiated on behalf of user system 12, which may also involve setting aside space in tenant space 112 (FIG. 2) and tenant data 114 (FIG. 2) for user system 12. Step 2312 may also involve modifying application metadata to accommodate user system 12. In step 2314, user system 12 uploads data. In step 2316, one or more data objects are added to tenant data 114 where the data uploaded is stored. In step 2318, the methods associated with FIGS. 4-22 may be implemented. In another embodiment, although depicted as distinct steps in FIG. 23, steps 2302-2418 may not be distinct steps. In other embodiments, method 2300 may not have all of the above steps and/or may have other steps in addition to, or instead of, those listed above. The steps of method 2300 may be performed in another order. Subsets of the steps listed above as part of method 2300 may be used to form their own method.

Method for Creating the Environment (FIGS. 1 and 2)

Figure 24:
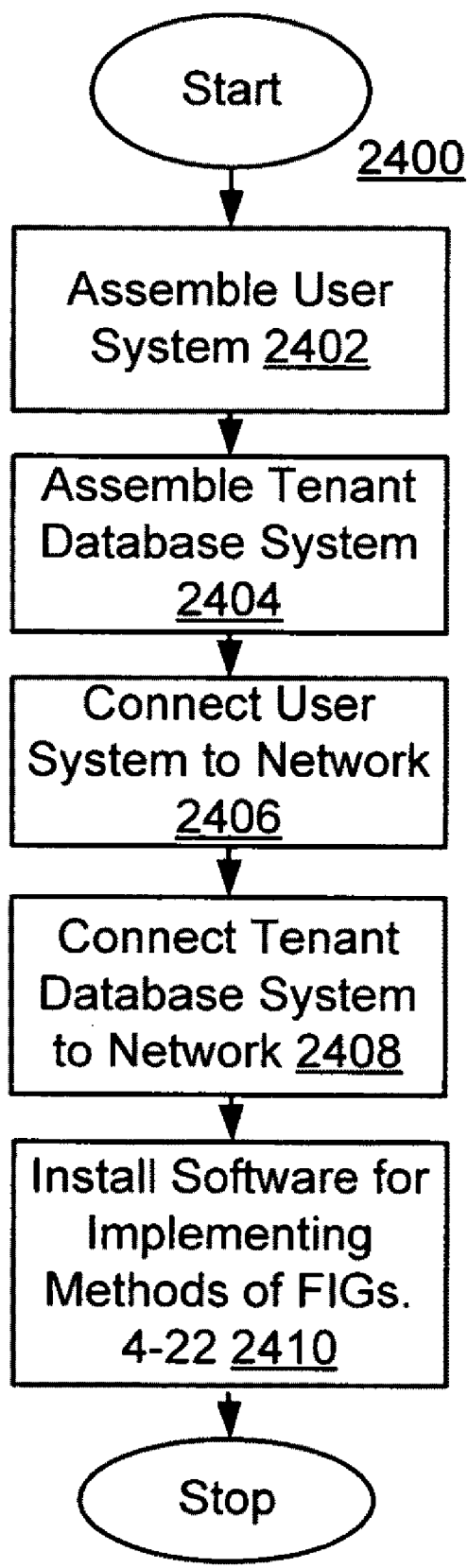
FIG. 24 shows a flowchart of an example of a method of making the environment of FIGS. 1 and 2.

FIG. 24 is a method of making environment 10, in step 2402, user system 12 (FIGS. 1 And 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 2404, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally, assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers $100_1$-$100_N$, system process space 102, tenant process spaces 104, tenant management process space 110, tenant space 112, tenant data 114, and application metadata 116 (FIG. 2).

In step 2406, user system 12 is communicatively coupled to network 104. In step 2408, system 16 is communicatively coupled to network 104 allowing user system 12 and system 16 to communicate with one another (FIG. 2). In step 2410, one or more instructions may be installed in system 16 (e.g., the instructions may be installed on one or more machine readable media, such as computer readable media, therein) and/or system 16 is otherwise configured for performing the steps of methods associated with FIGS. 4-22. For example, as part of step 2410, one or more instructions may be entered into the memory of system 16 for managing wealth including a calendar that automatically invites all team members associated with events being schedules and aggregates members of an aggregation group. In an embodiment, each of the steps of method 2400 is a distinct step. In another embodiment, although depicted as distinct steps in FIG. 24, steps 2402-2410 may not be distinct steps. In other embodiments, method 2400 may not have all of the above steps and/or may have other steps in addition to, or instead of, those listed above. The steps of method 2400 may be performed in another order. Subsets of the steps listed above as part of method 2400 may be used to form their own method.

Extensions and Alternatives

In an embodiment, each of the members of the relationship group may be included in the list of invitees that is automatically assembled upon scheduling an event. In an embodiment, the team may be associated with the relationship group and/or by default with each member of the group. Alternatively, each member of the group may have a different team or it may be the tenant's choice as to whether each member of the group is automatically assigned the same team or assigned different teams. In another an embodiment, there may be one team for the relationship group and each member may have their own team which may be different or the same as the team members assigned to the relationship group as a whole.

In an embodiment, each of the members of the relationship group may be included in the list of invitees that is automatically assembled upon scheduling an event. In an embodiment, the team may be associated with the relationship group and by default with each member of the group. Alternatively, each member of the group may have a different team or it may be the tenant's choice as to whether each member of the group is automatically assigned the same team or assigned different teams. In an embodiment, there may be one team for the relationship group and each member may have their own team, which may be different or the same as the team members assigned to the relationship group as a whole.

Each embodiment disclosed herein may be used or otherwise combined with any combination of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method of obtaining information from a multi-tenant database residing at a host system, the host system including one or more machines having a processor and memory, the method comprising:

receiving at the host system, by a machine of the host, a request from a user machine associated with a user of a tenant of the multi-tenant database for monetary information about a customer of the tenant; and in response, associating, by a machine of the host system, the customer with a group, the group including at least one other customer of the tenant, retrieving, by a machine of the host system, from the multi-tenant database the monetary information about the customer;

retrieving, by a machine of the host system, from the multi-tenant database monetary information about the group that is not included in the monetary information about the customer;

sending, from the host system, by a machine of the host system, the monetary information about the customer to the user of the tenant; and sending, from the host system, by a machine of the host system, the monetary information about the group that is not included in the information about the customer to the user of the tenant.

2. The method of claim 1, the retrieving from the multi-tenant database of the monetary information about the group includes at least retrieving information about the other customer.

3. The method of claim 1, further comprising receiving a request to mark a calendar with an event related to a group, in response, automatically sending an invitation to each member of the group, the invitation inviting a member of the group to the event.

4. The method of claim 1, further comprising:
  establishing a group by at least associating a member with the group by at least establishing a relationship in the database between the member and the group;
  assigning roles to the members of the group, each role describing a pre-established relationship that the member has with the group.

5. The method of claim 4, further comprising assigning a name to the group.

6. The method of claim 1, further comprising establishing a group by at least
  assigning a name to the group;
  associating a description of the group with the group; and
  adding members to the group.

7. The method of claim 1, further comprising:
  automatically invoking a query searching for team members, the team members including at least one customer and one or more users that are financial officers of the tenant, which is a financial services provider;
  receiving a selection of users from among the users returned by the query;
  receiving a selection of an invite element of a graphical user interface; and
  in response to receiving the selection of the invite button, automatically sending invitations to the users selected, the invitations inviting the users to an event.

8. The method of claim 1, the group being a relationship group, the method further comprising:
  receiving a request for a view of relationship groups, the relationship groups;
  in response,
    sending information for displaying a webpage including at least
      a list of the relationship groups;
      for a selected relationship group displaying
        an entry for a customer identifier that is associated with the customer;
        a list of other members of a relationship group to which the customer belongs;
        financial information of other members of the relationship group including at least an identifier identifying information of another member of the group, and a value of a financial account of the other member.

9. The method of claim 8, the webpage further including a list of open activities, each open activity in the list including at least
  a description of the open activity,
  one or more identifiers of members of the group participating in the activity,
  one or more identifiers of users of the tenant participating in the activity, and
  a scheduled date for the activity.

10. The method of claim 8, the webpage further including personal information about the customer.

11. The method of claim 1, further comprising:
  receiving a request for information about personal interests of the customer; and
  in response, sending a webpage having the personal interests of the customer.

12. The method of claim 11, further comprising:
  receiving a request for information about financial interests of the customer; and
  in response, sending a webpage having the personal interests of the customer.

13. The method of claim 1, further comprising:
  sending a webpage having
    a first menu including a list of major information categories;
    a second menu including a list of subcategories, each major information category being associated with a different list of subcategories, the subcategories presented by the second menu being different for each major category;
    receiving a selection from the first menu;
    receiving a selection from the second menu;
    receiving a selection of a particular item of the subcategory; and
    in response, presenting a list of items of the subcategory and a multiplicity of windows, each window presenting information about a different aspect of the item of the subcategory.

14. The method of claim 13, the first menu selection being set to cause the display of relationship groups and the second menu being set to display a particular type of relationship group, the list of items include at least a list of relationship groups belonging to the particular type;
  the multiplicity of windows including at least
    a list of members of the relationship group;
    a list of open activities;
    a history of activities;
    a list of financial accounts of the relationship group;
    a list of financial accounts jointly owned by more than one member of the relationship group;
    a summary of personal interests of members of the relationship group;
    a summary of financial interests of members of the relationship group; and
    a summary of opportunities of the relationship groups.

15. The method of claim 1, further comprising presenting a series of charts summarizing aspects of customers of the tenant.

16. The method of claim 1, the group having a multiplicity of members, one or more members of the group being assigned one or more roles.

17. The method of claim 1, the group having a multiplicity of members one or more members being assigned a priority.

18. The method of claim 1, the group having one or more members, each member being associated with an indication as to whether the member is included in a roll-up.

19. The method of claim 1, the user being presented with an option for creating an action plan as a template for performing a task.

20. The method of claim 1, the user being presented with a pre-established user-created template for performing a task.

21. A method of obtaining information from a multi-tenant database residing at a host system comprising:
  establishing, by a machine of the host system, a group by at least associating a member of the group with the group by at least
    establishing, by a machine of the host system, a relationship in the database between the member and the group;
    assigning, by a machine of the host system, roles to members of the group, each role describing a pre-established relationship that the member has with the group;
    assigning, by a machine of the host system, a name to the group;
    associating, by a machine of the host system, a description of the group with the group; and adding, by a machine of the host system, one or more other members to the group;

setting, by a machine of the host system, an indication as to whether the member is included in a roll-up;

receiving at the host system, by a machine of the host system, a request from a user machine of a user of a tenant of the multi-tenant database for monetary information about a customer of the tenant; and in response, determining, by a machine of the host system, that the customer is associated with a group, retrieving from the multi-tenant database, by a machine of the host system, the monetary information about the customer, the retrieving from the multi-tenant database of the monetary information about the group includes at least retrieving information about the other customer, retrieving from the multi-tenant database by a machine of the host system, monetary information about the group that is not included in the monetary information about the customer;

sending by a machine of the host system, the monetary information about the customer to the user of the tenant; and sending by a machine of the host system, the monetary information about the group that is not included in the information about the customer to the user of the tenant, the monetary information about the group being determined based on monetary information of members of the group having an indication of being included in the roll-up and not including monetary information of members having the indication of not being included in the roll-up;

receiving by a machine of the host system, a request to mark a calendar with an event related to a group;

in response, automatically, by a machine of the host system, sending an invitation to each member of a pre-established team that services the group, the invitation inviting the member of the pre-established team to the event;

automatically invoking, by a machine of the host system, a query searching for team members;

automatically selecting, by a machine of the host system, the team members to be invitees;

receiving, by a machine of the host system, a selection of an invite element of a graphical user interface;

in response to receiving the selection of the invite button, automatically sending by a machine of the host system, invitations to the team members, the invitations inviting the team members to the event;

receiving by a machine of the host system, a request for a view of relationship groups;

in response, sending by a machine of the host system, information for displaying a webpage including at least a list of relationship groups;

for a selected relationship group displaying an entry for a customer identifier that is associated with the customer;

a list of other members of a relationship group to which the customer belongs;

a list of accounts of the customer, which for each account includes at least an account identifier, a value of the account, and a descriptive word describing a type of the account;

financial information of other members of the relationship group including at least an identifier identifying information of another member of the group, and a value of a financial account of the other member;

the webpage further including a list of open activities, each open activity in the list including at least a description of the open activity, one or more identifiers of members of the group participating in the activity, one or more identifiers of users of the tenant participating in the activity, and a scheduled date for the activity;

the webpage further including personal information about the customer;

receiving by a machine of the host system, a request for information about personal interests of the customer; and in response, sending by a machine of the host system, a webpage having the personal interests of the customer;

receiving by a machine of the host system, a request for information about financial interests of the customer; and in response, sending by a machine of the host system, a webpage having the personal interests of the customer;

receiving by a machine of the host system, a request to view a console webpage sending by a machine of the host system, a console webpage having a first menu including a list of major information categories;

a second menu including a list of subcategories, each major information category being associated with a different list of subcategories, the subcategories presented by the second menu being different for each major category;

receiving by a machine of the host system, a selection from the first menu;

receiving by a machine of the host system, a selection from the second menu;

receiving by a machine of the host system, a selection of a particular item of the subcategory; and in response, presenting by a machine of the host system, a list of items of the subcategory and a multiplicity of windows, each window presenting information about a different aspect of the item of the subcategory;

the first menu selection being set by a machine of the host system, to cause the display of relationship groups and the second menu being set to display a particular type of relationship group, the list of items includes at least a list of relationship groups belonging to the particular type;

the multiplicity of windows including a list of members of the relationship group;

a list of open activities;

a history of activities;

a list of financial accounts of the relationship group;

a list of financial accounts jointly owned by more than one member of the relationship group;

a summary of personal interests of members of the relationship group;

a summary of financial interests of members of the relationship group; and a summary of opportunities of the relationship groups;

presenting a series of charts summarizing aspects of customers of the tenant.

22. A method of obtaining information from a multi-tenant database residing in a host system comprising:
- sending a request from a user machine having a processor and memory, the user machine being associated with a financial services advisor of customers of a tenant of the multi-tenant database for monetary information about a customer of the tenant to the host system, the tenant being a financial services provider; and
- in response to the sending of the request,
  - receiving at the user machine the monetary information about the customer to the financial services advisor of the tenant, which is the financial services provider; and
  - receiving at the user machine the monetary information about a group that is not included in the information about the customer to the financial services officer of the tenant, which is the financial services provider.

23. A machine readable medium storing thereon a one or more machine instructions, which when implemented by the machine, cause the machine to perform a method of obtaining information from a multi-tenant database residing at a host system, the host having a least one machine having a processor and a memory, the method comprising:
- receiving, by a machine of the host system, at the host system, a request, from a user machine associated with a financial services advisor employed for advising customers of a financial services provider that is a tenant of the multi-tenant database, for monetary information about a customer of the tenant; and
- in response,
  - associating, by a machine of the host system, the customer with a group, the group including at least one other customer of the tenant,
  - retrieving, by a machine of the host system, from the multi-tenant database the monetary information about the customer;
  - retrieving, by a machine of the host system, from the multi-tenant database monetary information about the group that is not included in the monetary information about the customer;
  - sending, from the host system, by a machine of the host system, the monetary information about the customer to the financial services advisor of the tenant; and
  - sending, from the host system, by a machine of the host system, the monetary information about the group that is not included in the information about the customer to the financial services advisor of the tenant.

24. The machine readable medium of claim 23, the retrieving from the multi-tenant database of the monetary information about the group includes retrieving information about the other customer.

25. The machine readable medium of claim 23, the method further comprising:
- establishing a group by at least associating a member with the group by at least establishing a relationship in the database between the member and the group;
- assigning roles to the members of the group, each role describing a pre-established relationship that the member has with the group.

26. The machine readable medium of claim 23, the method further comprising establishing a group by at least
- assigning a name to the group;
- associating a description of the group; and
- adding members to the group.

27. The machine readable medium of claim 23, the method further comprising
- receiving a request to mark a calendar with an event related to a group,
- in response,
  - automatically sending an invitation to each member of a pre-established team that services the group, the invitation inviting the member to the event.

28. The machine readable medium of claim 23, the method further comprising
- receiving a request to mark a calendar with an event related to a group,
- in response,
  - automatically sending an invitation to each member of the group, the invitation inviting a member of the group to the event.

29. The machine readable medium of claim 28, the method further comprising assigning a name to the group.

30. The machine readable medium of claim 23, the method further comprising:
- automatically invoking a query searching for team members, the team members including at least one customer and one or more users that are financial officers of the tenant, which is a financial services provider;
- receiving a selection of users from among the users returned by the query;
- receiving a selection of an invite element of a graphical user interface; and
- in response to receiving the selection of the invite button, automatically sending invitations to the users selected, the invitations inviting the users to an event.

31. The machine readable medium of claim 23, the group being a relationship group, the method further comprising:
- receiving a request for a view of relationship groups;
- in response,
  - sending information for displaying a webpage including at least
    - a list of the relationship groups;
    - for a selected relationship group displaying
      - an entry for a customer identifier that is associated with the customer;
      - a list of other members of a relationship group to which the customer belongs;
      - financial information of other members of the relationship group including at least
        - an identifier identifying information of another member of the group, and
        - a value of a financial account of the other member.

32. The machine readable medium of claim 31, the webpage further including a list of open activities, each open activity in the list including at least
- a description of the open activity,
- one or more identifiers of members of the group participating in the activity,
- one or more identifiers of users of the tenant participating in the activity, and
- a scheduled date for the activity.

33. The machine readable medium of claim 31, the webpage further including personal information about the customer.

34. The machine readable medium of claim 23, further comprising:
- receiving a request for information about personal interests of the customer; and
- in response, sending a webpage having the personal interests of the customer.

35. The machine readable medium of claim 34, the method further comprising:
    receiving a request for information about financial interests of the customer; and
    in response, sending a webpage having the financial interests of the customer.

36. The machine readable medium of claim 23, the method further comprising:
    sending a webpage having
        a first menu including a list of major information categories;
        a second menu including a list of subcategories, each major information category being associated with a different list of subcategories, the subcategories presented by the second menu being different for each major category;
        receiving a selection from the first menu;
        receiving a selection from the second menu;
        receiving a selection of a particular item of the subcategory; and
        in response, presenting a list of items of the subcategory and a multiplicity of windows, each window presenting information about a different aspect of the item of the subcategory.

37. The machine readable medium of claim 36, the first menu selection being set to cause the display of relationship groups and the second menu being set to display a particular type of relationship group, the list of items include at least a list of relationship groups belonging to the particular type;
    the multiplicity of windows including at least
        a list of members of the relationship group;
        a list of open activities;
        a history of activities;
        a list of financial accounts of the relationship group;
        a list of financial accounts jointly owned by more than one member of the relationship group;
        a summary of personal interests of members of the relationship group;
        a summary of financial interests of members of the relationship group; and
        a summary of opportunities of the relationship groups.

38. The machine readable medium of claim 23, the method further comprising presenting a series of charts summarizing aspects of customers of the tenant.

39. The machine readable medium of claim 23, the group having a multiplicity of members, one or more members of the group being assigned one or more roles.

40. The machine readable medium of claim 23, the group having a multiplicity of members one or more members being assigned a priority.

41. The machine readable medium of claim 23, the group having one or more members, each member being associated with an indication as to whether the member is included in a roll-up.

42. The machine readable medium of claim 23, the user being presented with an option for creating an action plan as a template for performing a task.

43. The machine readable medium of claim 23, the user being presented with a pre-established user-created template for performing a task.

44. A system for obtaining information from a multi-tenant database residing at a host system, the system comprising:
    a host system including at least one machine having
        a processor system, and
        a memory system having at least
        a machine readable medium storing thereon one or more machine instructions, which when implemented by the machine, cause the machine to perform a method of obtaining information from a multi-tenant database residing at a host system comprising:
    receiving at the host system, by the machine of the host system, a request from a user machine associated with a financial services advisor employed for advising customers of a financial services provider that is a tenant of the multi-tenant database for monetary information about a customer of the tenant; and
    in response,
        associating, by the machine of the host system, the customer with a group, the group including at least one other customer of the tenant,
        retrieving, by the machine of the host system, from the multi-tenant database the monetary information about the customer;
        retrieving, by the machine of the host system, from the multi-tenant database monetary information about the group that is not included in the monetary information about the customer;
        sending, from the host system, by the machine of the host system, the monetary information about the customer to the financial services advisor of the tenant, which is the financial services provider; and
        sending, from the host system, by the machine of the host system, the monetary information about the group that is not included in the information about the customer to the financial services advisor of the tenant, which is the financial services provider.

45. The system of claim 44, the retrieving from the multi-tenant database of the monetary information about the group includes retrieving information about the other customer.

46. The system of claim 44, the method further comprising:
    establishing a group by at least associating a member with the group by at least establishing a relationship in the database between the member and the group;
    assigning roles to the members of the group, each role describing a pre-established relationship that the member has with the group.

47. The system of claim 44, the method further comprising establishing a group by at least
    assigning a name to the group;
    associating a description of the group; and
    adding members to the group.

48. The system of claim 44, the method further comprising receiving a request to mark a calendar with an event related to a group,
    in response,
        automatically sending an invitation to each member of a pre-established team that services the group, the invitation inviting the member to the event.

49. The system of claim 44, the method further comprising receiving a request to mark a calendar with an event related to a group,
    in response,
        automatically sending an invitation to each member of the group, the invitation inviting a member of the group to the event.

50. The system of claim 49, the method further comprising assigning a name to the group.

51. The system of claim 44, the method further comprising:
    automatically invoking a query searching for team members, the team members including at least one customer and one or more users that are financial officers of the tenant, which is a financial services provider;
    receiving a selection of users from among the users returned by the query;

receiving a selection of an invite element of a graphical user interface; and in response to receiving the selection of the invite button, automatically sending invitations to the users selected, the invitations inviting the users to an event.

52. The system of claim 44, the group being a relationship group, the method further comprising:

receiving a request for a view of relationship groups;

in response,
sending information for displaying a webpage including at least
a list of the relationship groups;
for a selected relationship group displaying
an entry for a customer identifier that is associated with the customer;
a list of other members of a relationship group to which the customer belongs;
financial information of other members of the relationship group including at least
an identifier identifying information of another member of the group, and
a value of a financial account of the other member.

53. The system of claim 52, the webpage further including a list of open activities, each open activity in the list including at least
a description of the open activity,
one or more identifiers of members of the group participating in the activity,
one or more identifiers of a user of the tenant participating in the activity, and
a scheduled date for the activity.

54. The system of claim 52, the webpage further including personal information about the customer.

55. The system of claim 44, further comprising:
receiving a request for information about personal interests of the customer; and
in response, sending a webpage having the personal interests of the customer.

56. The system of claim 55, the method further comprising:
receiving a request for information about financial interests of the customer; and
in response, sending a webpage having the financial interests of the customer.

57. The system of claim 44, the method further comprising:
sending a webpage having
a first menu including a list of major information categories;
a second menu including a list of subcategories, each major information category being associated with different list of subcategories, the subcategories presented by the second menu being different for each major category;
receiving a selection from the first menu;
receiving a selection from the second menu;
receiving a selection of a particular item of the subcategory; and
in response, presenting a list of items of the subcategory and a multiplicity of windows, each window presenting information about a different aspect of the item of the subcategory.

58. The system of claim 57, the first menu selection being set to cause the display of relationship groups and the second menu being set to display a particular type of relationship group, the list of items includes at least a list of relationship groups belonging to the particular type;

the multiplicity of windows including at least
a list of members of the relationship group;
a list of open activities;
a history of activities;
a list of financial accounts of the relationship group;
a list of financial accounts jointly owned by more than one member of the relationship group;
a summary of personal interests of members of the relationship group;
a summary of financial interests of members of the relationship group; and
a summary of opportunities of the relationship groups.

59. The system of claim 44, the method further comprising presenting a series of charts summarizing aspects of customers of the tenant.

60. The system of claim 44, the group having a multiplicity of members, one or more members of the group being assigned one or more roles.

61. The system of claim 44, the group having a multiplicity of members one or more members being assigned a priority.

62. The system of claim 44, the group having one or more members, each member being associated with an indication as to whether the member is included in a roll-up.

63. The system of claim 44, the user being presented with an option for creating an action plan as a template for performing a task.

64. The system of claim 44, the user being presented with a pre-established user-created template for performing a task.

65. A method of obtaining information from a multi-tenant database residing at a host system, the host system including one or more machines having a processor and memory, the method comprising:

receiving at the host system, by a machine of the host system, a request from a user machine associated with a user of a tenant of the multi-tenant database for monetary information about a customer of the tenant; and in response,
associating, by a machine of the host system, the customer with a group, the group including at least one other customer of the tenant,
retrieving, by a machine of the host system, from the multi-tenant database the monetary information about the customer;
retrieving, by a machine of the host system, from the multi-tenant database monetary information about the group that is not included in the monetary information about the customer;
sending, from the host system, by a machine of the host system, the monetary information about the customer to the user of the tenant; and
sending, from the host system, by a machine of the host system, the monetary information about the group that is not included in the information about the customer to the user of the tenant receiving by a machine of the host system, a request to mark a calendar with an event related to a group, in response,
automatically sending by a machine of the host system, an invitation to each member of a pre-established team that services the group, the invitation inviting the member to the event.

\* \* \* \* \*